United States Patent
Denoual et al.

(10) Patent No.: US 11,700,434 B2
(45) Date of Patent: Jul. 11, 2023

(54) METHOD AND APPARATUS FOR GENERATING MEDIA DATA

(71) Applicant: CANON KABUSHIKI KAISHA, Tokyo (JP)

(72) Inventors: Franck Denoual, Saint Domineuc (FR); Frédéric Maze, Langan (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/479,890

(22) Filed: Sep. 20, 2021

(65) Prior Publication Data

US 2022/0007087 A1    Jan. 6, 2022

Related U.S. Application Data

(63) Continuation of application No. 16/497,257, filed as application No. PCT/EP2018/057052 on Mar. 20, 2018, now Pat. No. 11,265,622.

(30) Foreign Application Priority Data

Mar. 27, 2017 (GB) .................................. 1704882
May 24, 2017 (GB) .................................. 1708337

(51) Int. Cl.
*H04N 21/845* (2011.01)
*H04N 19/70* (2014.01)
(Continued)

(52) U.S. Cl.
CPC ......... *H04N 21/8456* (2013.01); *H04N 19/70* (2014.11); *H04N 21/2353* (2013.01);
(Continued)

(58) Field of Classification Search
None
See application file for complete search history.

(56) References Cited

U.S. PATENT DOCUMENTS

2006/0130121 A1*  6/2006  Candelore .......... H04N 21/8541
                                                              725/115
2012/0036544 A1    2/2012  Chen et al.
(Continued)

FOREIGN PATENT DOCUMENTS

KR              960706259 A      11/1996
KR         10-2015-0097723 A      8/2015
(Continued)

OTHER PUBLICATIONS

Gao Rui, System Design for Managing and Sharing of Geo-spatial Metadata, China Academic Journal Electronic Publishing House.
(Continued)

*Primary Examiner* — Alexander Q Huerta
(74) *Attorney, Agent, or Firm* — Canon U.S.A., Inc. IP Division

(57) ABSTRACT

The present invention concerns a method for generating media files from video sequences, the method comprising by a server:
  obtaining from the video sequences, video data composed of a plurality of samples;
  generating a video track based on the obtained video data, each video track comprises samples of a video sequence, and the video track is associated with descriptive metadata, the descriptive metadata comprises:
  a spatial information related to one or more samples of the associated video track; and
  a composition information for organizing generated video tracks to get a full picture when displayed by a client; and
  generating media files including the generated video tracks.

10 Claims, 14 Drawing Sheets

(51) Int. Cl.
*H04N 21/854* (2011.01)
*H04N 21/2343* (2011.01)
*H04N 21/235* (2011.01)

(52) U.S. Cl.
CPC ............ *H04N 21/23439* (2013.01); *H04N 21/234345* (2013.01); *H04N 21/85406* (2013.01)

(56) References Cited

U.S. PATENT DOCUMENTS

| | | | | |
|---|---|---|---|---|
| 2017/0237965 | A1* | 8/2017 | Wang | H04N 13/178 348/42 |
| 2018/0020268 | A1* | 1/2018 | Denoual | H04N 21/8456 |
| 2018/0160136 | A1* | 6/2018 | Denoual | H04N 19/46 |
| 2018/0279014 | A1* | 9/2018 | Chen | H04N 5/262 |
| 2019/0110081 | A1* | 4/2019 | Denoual | H04N 19/70 |
| 2019/0174116 | A1* | 6/2019 | Oh | H04N 13/178 |
| 2019/0253734 | A1* | 8/2019 | Lee | H04N 21/8456 |
| 2019/0325652 | A1* | 10/2019 | Di | H04N 21/4402 |
| 2020/0107006 | A1* | 4/2020 | Lee | H04N 19/103 |
| 2020/0107051 | A1* | 4/2020 | Oh | H04N 21/43072 |
| 2022/0007087 | A1* | 1/2022 | Denoual | H04N 21/234345 |

FOREIGN PATENT DOCUMENTS

| | | |
|---|---|---|
| KR | 10-2016-0034951 A | 3/2016 |
| KR | 10-2016-0074485 A | 6/2016 |
| KR | 10-2016-0075554 A | 6/2016 |
| KR | 10-2016-0105793 A | 9/2016 |

OTHER PUBLICATIONS

Miska M. Hannuksela, et al., Overview of the High Efficiency Image File Format, Joint Collaborative Team on Video Coding (JCT-VC) of ITU-T SG 16 WP 3 and ISO/IEC JTC1/SC29/WG11, 22nd Meeting, Geneva, CH, Oct. 15-21, 2015, 16 pages, Doc. No. JCTVC-V0072.

Edited by Miska M. Hannuksela, Technologies under Consideration for ISOBMFF, International Organisation for Standardisation, Coding of Moving Pictures and Audio, ISO/IEC JTC1/SC29/WG11 MPEG2017/N16616, Geneva, CH, Jan. 2017, XP30023287A.

* cited by examiner

METHOD AND APPARATUS FOR GENERATING MEDIA DATA

CROSS REFERENCE TO RELATED APPLICATION

This application is a continuation of U.S. patent application Ser. No. 16/497,257, presently pending and filed on Sep. 24, 2019, which is a National Phase application of PCT Application No. PCT/EP2018/057052, filed on Mar. 20, 2018. This application claims the benefit under 35 U.S.C. § 119(a)-(d) of United Kingdom Patent Application No. 1704882.8, filed on Mar. 27, 2017 and United Kingdom Patent Application No. 1708337.9, filed on May 24, 2017. The above-cited patent applications are incorporated herein by reference in their entirety.

FIELD OF THE INVENTION

The present disclosure generally relates to the field of encapsulation and parsing of timed media data, e.g. according to ISO Base Media File Format as defined by the MPEG standardization organization, to provide a flexible and extensible format that facilitates interchange, management, editing, and presentation of the media data and to improve stream management.

BACKGROUND OF THE INVENTION

The International Standard Organization Base Media File Format (ISO BMFF, ISO/IEC 14496-12) is a well-known flexible and extensible format that describes encoded timed media data bitstreams either for local storage or transmission via a network or via another bitstream delivery mechanism. This file format is object-oriented. It is composed of building blocks called boxes that are sequentially or hierarchically organized and that define parameters of the encoded timed media data bitstream such as timing and structure parameters. In the file format, the overall presentation is called a movie. It is logically divided into tracks. Each track represents a timed sequence of media data (frames of video, for example). Within each track, each timed unit of data is called a sample; this might be a frame of video or audio. Samples are implicitly numbered in sequence. The movie can be organized as a list of movie and track fragments. The movie fragments extend the presentation in time. They provide the information that would previously have been in a box called the MovieBox. The actual samples are in boxes called MediaDataBoxes. Within a movie fragment there is a set of track fragments, zero or more per track. The track fragments in turn contain zero or more track runs, each of which document a contiguous run of samples for that track.

The file format has another part (Part-5, ISO/IEC 14496-15) that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding) or L-HEVC (Layered HEVC).

HEVC and similar video encoding formats define different spatial subdivisions of samples, e.g. pictures: tiles, slices and slice segments. A tile defines a rectangular region of a picture that contains an integer number of Coding Tree Units (CTUs) or coding blocks, all referred to hereinafter coding units. As such, tiles are good candidates to represent regions of interest (ROI). However, coded video data (bitstream) organization in terms of syntax and its encapsulation into NAL units (or NALUs) is rather based on slices and slice segments (as in AVC).

A slice in HEVC is a set of slice segments, with at least the first slice segment being an independent slice segment, the others, if any, being dependent slice segments. A slice segment contains an integer number of consecutive (in raster scan order) CTUs. The slice does not necessarily have a rectangular shape (it is thus less appropriate than tiles for ROI representation). A slice segment is encoded in the HEVC bitstream as a slice_segment_header followed by slice_segment_data. Independent slice segments (ISS) and dependent slice segments (DSS) differ by their header: the dependent slice segment has a shorter header because reusing information from the independent slice segment's header. Both independent and dependent slice segments contain a list of entry points in the bitstream.

When a video bitstream is encoded with tiles, there exist description tools in the Part-15 of the MPEG file format to describe the mapping of the NAL units to tiles. This Part-15 describes tools to encapsulate the tiles either as:
  all tiles in a single video track; or
  each HEVC tile in a tile track with common information among the tile tracks stored in a tile base track;
  or sets of HEVC tiles forming a rectangular region in a tile track with common information among the tile tracks stored in a tile base track.

A media content creator wants to provide different versions of a video, namely several videos generated from a same original video through composition, image effects or operations applied to the recorded video samples. The problem is to offer these different presentations of the media content without increasing too much the size of the resulting media file.

The present invention has been devised to address one or more of the foregoing concerns. The proposed scheme performs standard encapsulation of the media tracks and further builds one or more specific tracks called generated tracks that contain only generation rules and parameters from the input media tracks. Thus the media data are stored once and referenced from the generated tracks. Each generated track consists in a set of transform operators and parameters described in its track header with pointers on used origin track. There are alternative description and storage for the transformation parameters depending on whether they are static (same for all samples) or dynamic (changing on sample basis). For example, one possibility is to store operator or transformation parameters at the sample level in the 'mdat' box (Media Data Box).

According to a first aspect of the invention there is provided a method for encoding media data composed of a plurality of samples, the method comprising by a server device:
  encoding the media data to obtain encoded media data;
  encapsulating the encoded media data in a set of at least one first track;
  generating a second track;
  wherein:
  the second track describes samples representing the result of applying a set of at least one transformation operator to samples of at least one first track;
  the second track comprises references to at least one of the first tracks; and
  the second track comprises in the metadata part, a description of the set of transformation operators.

In an embodiment, the method further comprises:
encapsulating one or more parameters for characterizing at least one transformation operator, in the metadata part of the second track.

According to another aspect of the invention there is provided a method for decoding media data composed of a plurality of samples, the method comprising by a client device:
receiving a first track comprising references to at least one second track and a description of a set of at least one transformation operator;
receiving the at least one second track;
generating the samples of the media data by applying the set of transformation operators to samples received in the at least one second track.

According to another aspect of the invention there is provided a server device for encoding media data composed of a plurality of samples, the server device comprising a processor adapted to:
encoding the media data to obtain encoded media data;
encapsulating the encoded media data in a set of at least one first track;
generating a second track;
wherein:
the second track describes samples representing the result of applying a set of at least one transformation operator to samples of at least one first track;
the second track comprises references to at least one of the first tracks; and
the second track comprises in the metadata part, a description of the set of transformation operators.

According to another aspect of the invention there is provided a client device for decoding media data composed of a plurality of samples, the client device comprising a processor adapted to:
receiving a first track comprising references to at least one second track and a description of a set of at least one transformation operator;
receiving the at least one second track;
generating the samples of the media data by applying the set of transformation operators to samples received in the at least one second track.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

As mentioned previously, HEVC and similar video encoding formats define different spatial subdivisions of samples, e.g. pictures: tiles, slices and slice segments. HEVC provides implicit rules for composing the tiles that a client wants to display. Other similar video encoding format (like AVC or OMAF) does not benefit from these implicit rules and need to provide composition information so that the client can display a video made of subparts. The composition information are coupled with spatial information (position and size) related to the subparts to compose.

However the methods and devices provided in the prior art are static, and do not allow adapting the spatial information along the time as often as desired. It could be quite problematic for some applications, in particular those allowing the combination of spatial video parts, when the positions and sizes of the video parts change (for example when tracking a moving object in a video sequence).

The present invention has also been devised to address the foregoing concerns.

According to another aspect of the invention, it is provided a method for generating media files from video sequences, the method comprising by a server:
obtaining from the video sequences, video data composed of a plurality of samples;
generating a video track based on the obtained video data, each video track comprises samples of a video sequence, and the video track is associated with descriptive metadata, the descriptive metadata comprises:
a spatial information related to one or more samples of the associated video track; and
a composition information for organizing generated video tracks to get a full picture when displayed by a client; and
generating media files including the generated video tracks.

In other words, the invention proposed to implement the spatial information so that they can be associated with one or more samples. The number of concerned samples can be adapted to the situation, providing more flexibility.

Moreover, in case the encoding format already provides spatial information associated to one or more samples, the invention allows avoiding the duplication of this spatial information, by reusing it for composing the video subparts.

According to another aspect of the invention, it is provided a method for parsing media files comprising video data corresponding to video sequences, the video data being composed of a plurality of samples, the method comprising by a client:
obtaining video tracks from the video data, each video track comprises samples of a video sequence, and the video track is associated with descriptive metadata, the descriptive metadata comprises:
a spatial information related to one or more samples of the associated video track; and
a composition information for organizing generated video tracks to get a full picture when displayed by the client.

According to another aspect of the invention, it is provided program which, when executed by a computer or processor, causes the computer or processor to carry out the method described above.

According to another aspect of the invention, it is provided a computer-readable storage medium storing the program mentioned above.

According to another aspect of the invention, it is provided a device for generating media files from video sequences, the device comprising:
means for obtaining from the video sequences, video data composed of a plurality of samples;
means for generating a video track based on the obtained video data, each video track comprises samples of a video sequence, and the video track is associated with descriptive metadata, the descriptive metadata comprises:
a spatial information related to one or more samples of the associated video track; and
a composition information for organizing generated video tracks to get a full picture when displayed by a client; and
means for generating media files including the generated video tracks.

According to another aspect of the invention, it is provided a device for parsing media files comprising video data corresponding to video sequences, the video data being composed of a plurality of samples, the device comprising:
means for obtaining video tracks from the video data, each video track comprises samples of a video sequence, and the video track is associated with descriptive metadata, the descriptive metadata comprises:
a spatial information related to one or more samples of the associated video track; and
a composition information for organizing generated video tracks to get a full picture when displayed by a client.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
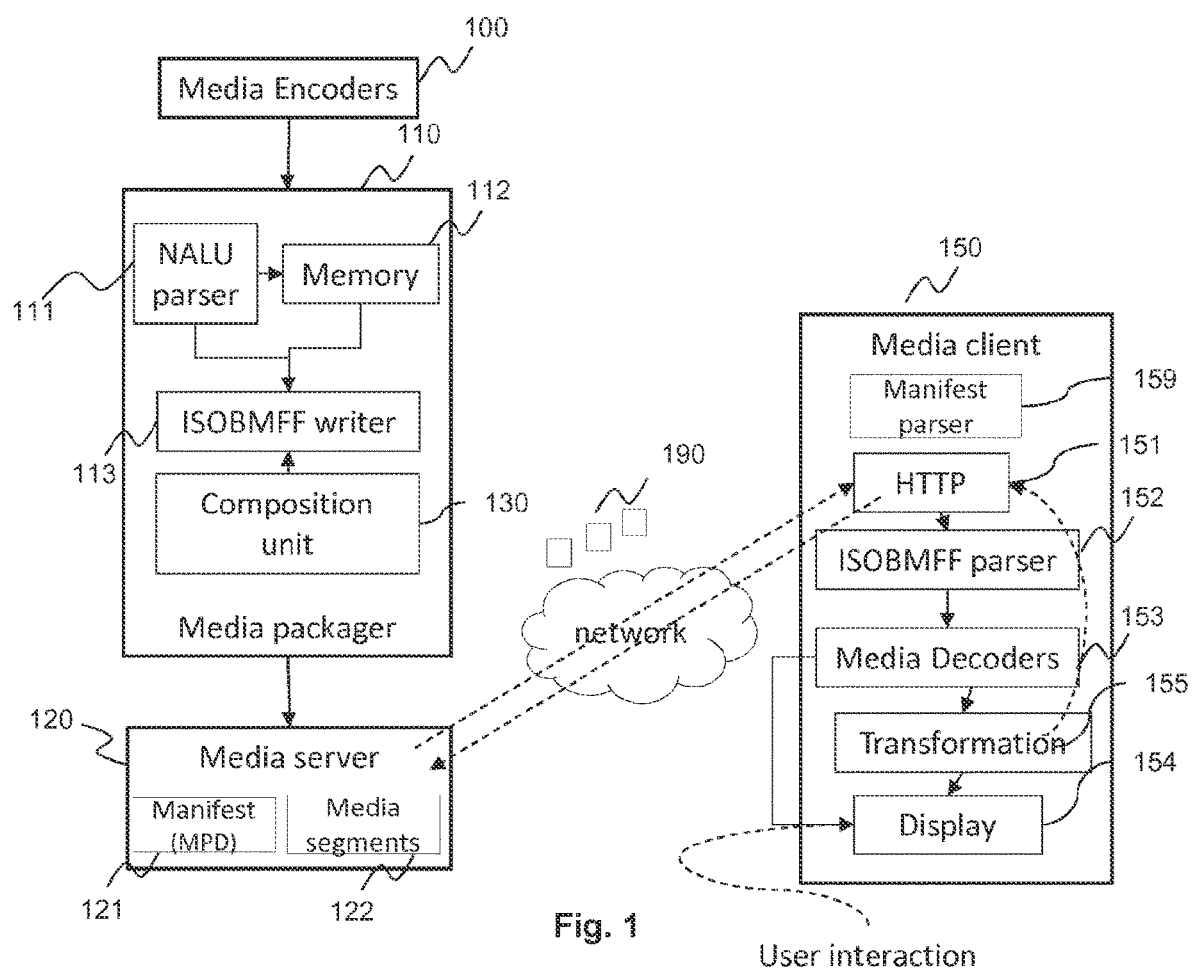
FIG. 1 illustrates a typical client server system in which the invention may be used.

FIG. 1 illustrates a typical client server system in which the invention may be used. The invention is not restricted to such system as it may concern the generation of media files that may be distributed in any way, not only by streaming over a communication network.

The system comprises at a server side: media encoders 100, in particular a video encoder, a media packager 110 and a media server 120. The media packager 110 comprises a NALU parser 111, a memory 112 and a ISOBMFF (ISOBMFF) writer 113. The media server 120 can generate a manifest file (MPD) 121 and media segments 122. The system further comprises at client side a media client 150 with different modules: an ISOMBFF parser 152, media decoders 153 in particular a video decoder, a display 154 and a HTTP client 151 that supports adaptive HTTP streaming, in particular parsing of streaming manifest 159 to control the streaming of media segments 190. It also contains a module capable of performing operations on encoded bitstreams and/or decoded picture: the transformation module 155.

Typically, the media client 150 requests the manifest file 121 in order to get the description of the different media representations available on the media server 120. Accordingly, the media client 150 then requests the media segments 122 it is interested in. These requests are done via the HTTP module 151. The received media segments are then parsed by the ISOBMFF parser 152, decoded by the video decoder 153, optionally transformed through the transformation unit 155 to be played on the display 154.

A video sequence is typically encoded by the video encoder 100 to be encapsulated into one or several files by the media packager 110. The generated files are made available to clients by the Media server 120.

According to some embodiments of the invention, another module is included in the system as part of the media packager or outside the media packager: the generation unit 130. This unit allows a user to watch the encapsulated media tracks and to edit and modify by applying various image operations onto the samples. This generation unit interacts with the media packager when the user wants to insert the result of his composition as an additional track in the media file produced by the ISOBMFF Writer.

The media server is optional in the sense that the invention mainly deals with the media encapsulation and construction/description of tracks resulting from composition, derivation, combination, transformation or aggregation of one or more media tracks. As for the media server, the transmission part (HTTP module and manifest parser) is optional in the sense that the invention also applies for a media client consisting in a simple media player to which the encapsulated media file is provided for rendering. The media file can be provided by full download, by progressive download, by adaptive streaming or just by reading the media file on a disk or from a memory.

Figure 7:
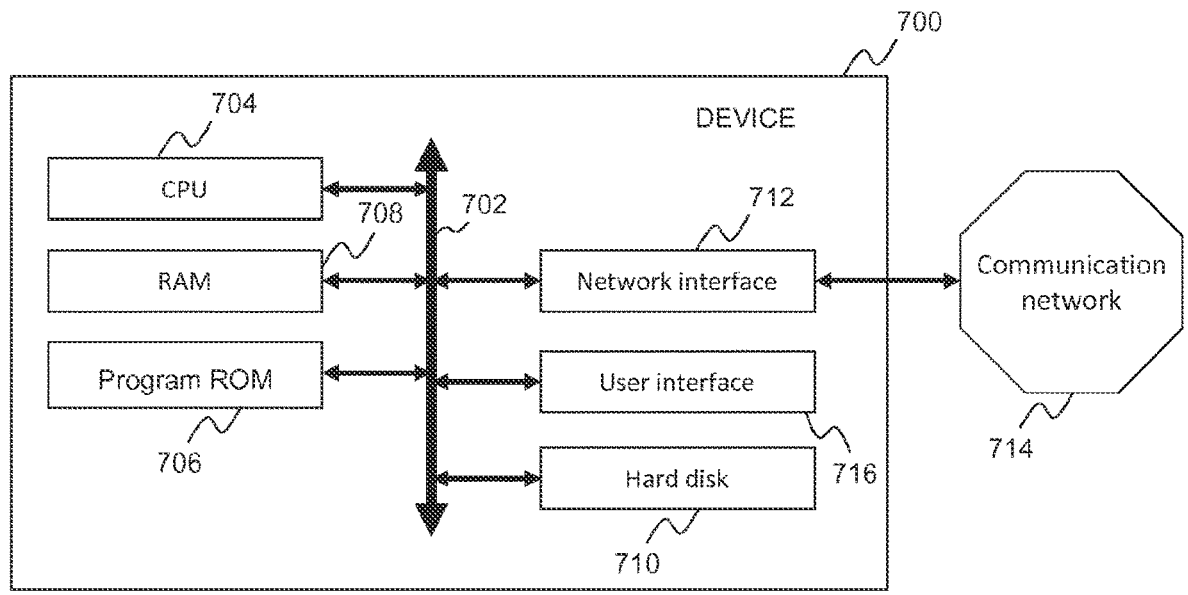
FIG. 7 represents a block diagram of a server or a client device in which steps of one or more embodiments may be implemented.

The method according to the invention is performed by the media packager module 110, and more specifically by the ISOBMFF writer module 113 in cooperation with the composition unit 130, comprising software code, when executed by CPU 704 of server apparatus as illustrated in FIG. 7.

Typically, the encapsulation module is in charge of reading high-level syntax of a video bitstream composed of compressed video to extract and identify the different NAL units and organize encoded data in a ISOBMFF file or ISOBMFF segments 122 containing the video bitstream as one or more tracks with descriptive metadata according to the ISOBMFF box hierarchy. The ISOBMFF file or ISOBMFF segments 122 potentially contain also one or more other synchronized media tracks, for example, audio, subtitles, text, metadata . . . ). According to an aspect of the invention, the ISOBMFF writer generates additional tracks to the media tracks that result from composition or transformation or derivation or effects applied to the media tracks by the composition unit 130. In order to avoid duplicating the data, namely the original data plus the generated data, the ISOBMFF writer 113 builds one or more specific tracks, called generated tracks, that instead of providing the result of the transformation, describe the transformation rules and parameters to build the generated tracks. One generated track is created per composition or derivation. This has the advantage of keeping in the same media file both original and transformed tracks. The encapsulation process is further detailed in reference to FIG. 4. The parsing process, reading and rendering of the media file or media segments is detailed in reference to FIGS. 5 and 6.

Figure 2:
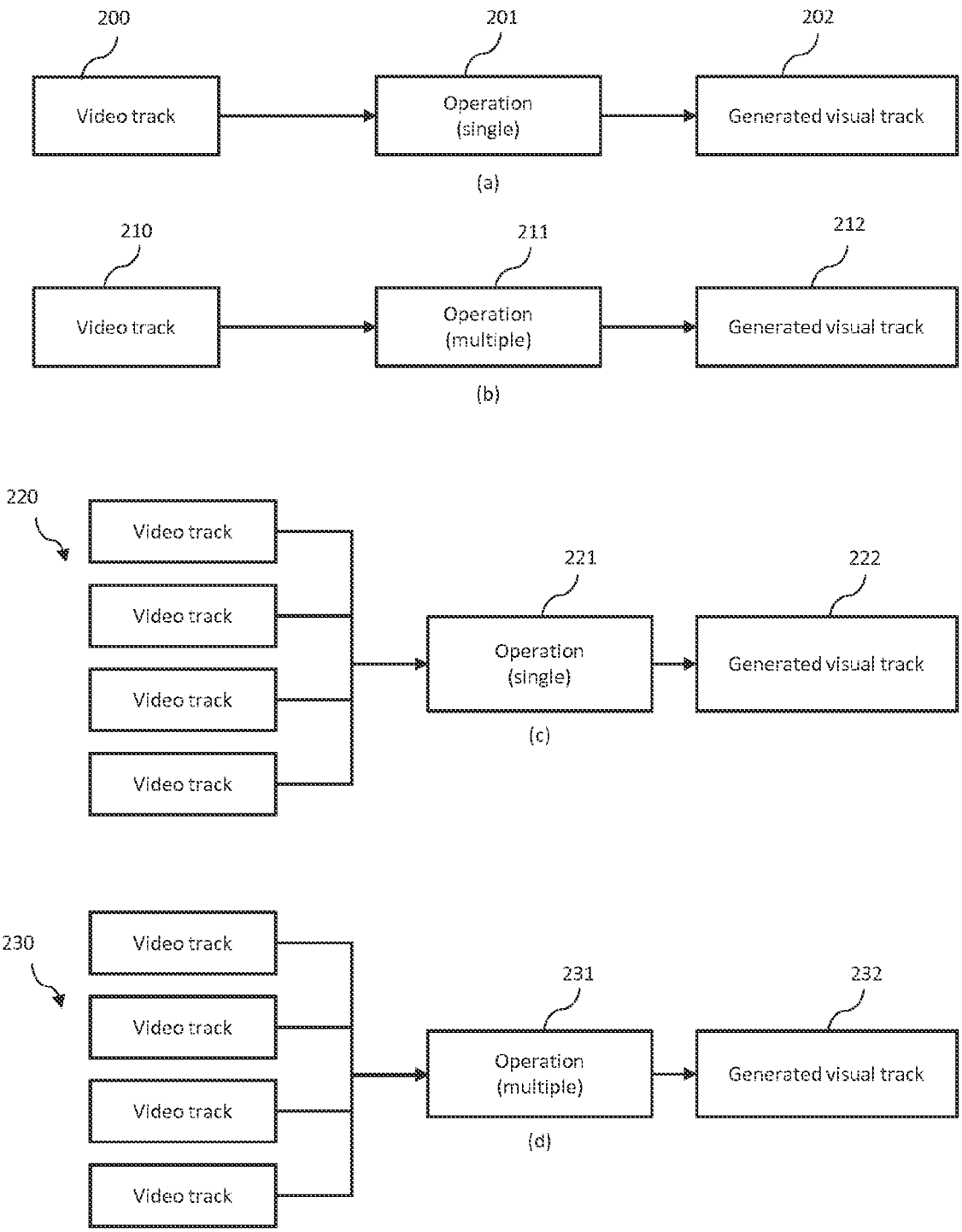
FIG. 2 illustrates different ways of generating tracks from visual tracks according to an embodiment of the invention.

FIG. 2 illustrates different ways of generating tracks from visual tracks. A Generated Visual Track can result from one or multiple operations applied to one or more video tracks.

FIG. 2 (a) depicts a generated visual track 202 obtained from a single input video track 200 through a single transformation operator 201.

FIG. 2 (b) depicts a generated visual track 212 obtained from a single input video track 210 through multiple transformation operators 211.

FIG. 2 (c) depicts a generated visual track 222 obtained from a multiple video tracks 220 through a single operation 221.

FIG. 2 (d) depicts a generated visual track 232 obtained from a multiple video tracks 230 through multiple operations 231.

There are cases where the samples of a generated track are computed with the same transformation operator and same transformation operator parameters for all the samples. We call this kind of transformation a static transformation. At the opposite, there are cases where each sample can have different transformation operator parameters from one to another. In this case we talk about dynamic transformation. While the current design for generated visual tracks is adapted for dynamic transformation, it leads to some description overhead for static transformation (repeating transformation operator and parameters in each generated sample). Moreover the current design implies that transformation are described in media data box. This may be sensitive to track editing, for example when adding or removing a track from the media file, the offsets to generated samples may be impacted. This invention proposes as most as possible to describe the transformations in the metadata boxes, avoiding mixing with media data. For that, the design depicted in FIG. 3 suggests to define the transformation rules in the generated track's metadata and when possible to declare the parameters in track's metadata as well, at least for static transformation. For dynamic transformations, the transformation parameters can be stored in external tracks, for example timed metadata tracks, or in the generated samples. The external tracks can be in the encapsulated media file but also contained in another media file. The design according to the invention supports both static and dynamic transformation parameters declaration.

Figure 3:
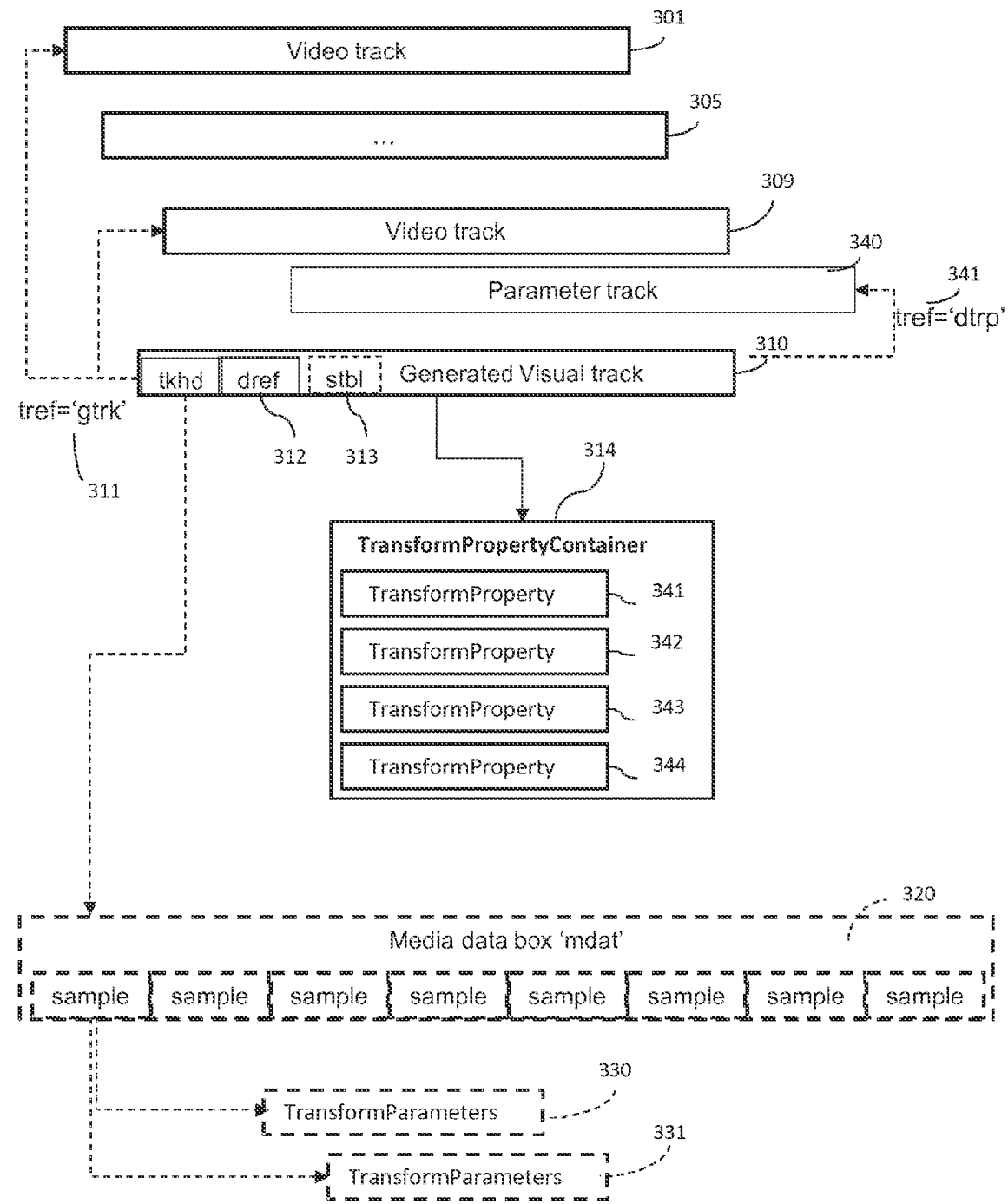
FIG. 3 illustrates the generated visual track design according to an embodiment of the invention.

FIG. 3 illustrates the generated visual track design according to an embodiment of the invention.

A Generated Visual Track (GVT) (or Derived Visual Track) (DVT) is described as a video track. Its handler is set to the reserved four-character code: 'vide'. The tracks from which a GVT 310 is generated are referenced via a track reference type with value 'gtrk' or ('dtrk') going from the GVT and pointing to each of the input video track. For example, the GVT 310 is generated from input video tracks 301 and 309, the track 305 is not used in the generation process. As for any track, the GVT 310 contains a Data Reference Box 312 that indicates whether the data are in the file or in a remote file. In the example of FIG. 3, the data, meaning the samples, related to the GVT are in the media data box 'mdat' 320. The Data Reference Box 312 can also be used to refer for example metadata tracks providing transformation parameters that are stored in other media files. The GVT 310 contains a SampleTableBox 'stbl' 313 describing the samples.

A generated visual track contains, in its descriptive metadata boxes, a TransformPropertyContainer 314 that contains the list of transformation or operations 341 to 344 to derive a Generated Visual Track from the input tracks.

Each of these transformations or operations is declared with a parameter indicating whether it is a static transformation or a dynamic transformation. It also contains a parameter indicating whether it applies to a single input media track or to a list of input media tracks. Another parameter of the TransformProperty indicates whether the operation or transformation applies after or before decoding of the input samples.

For example, referring to FIG. 2 (a), the Generated Visual Track 310 references only one video track through the track reference type 311. The Transform PropertyContainer 314 then contains a single Transform Property type. Referring to FIG. 2 (b), the Generated Visual Track 310 references a single video track through the track reference type 311. The Transform PropertyContainer 314 then contains a list of Transform Property types. Referring to FIG. 2 (c), the Generated Visual Track 310 references multiple video tracks through the track reference type 311. The TransformPropertyContainer 314 contains a single TransformProperty type. Referring to FIG. 2 (d), the Generated Visual Track 310 references multiple video tracks through the track reference type 311. The Transform PropertyContainer 314 then contains a list of Transform Property types.

The TransformProperty box may be specialized into a single input track TransformProperty box and a multi-track TransformProperty box. This is done in a preferred embodiment by specifying a different value of its "version" parameter. When the "version" parameter of the TransformProperty box takes the value 1, then it means that a single input track is provided as transformation operand. When the "version" parameter of the TransformProperty box takes the value 2, then it means that multiple input tracks are considered as transformation operands; i.e. a generated sample is computed from many input video samples.

We then propose a Generated Visual Track design, introducing a transformation container box 314 and defining the TransformProperty box as follows:

Declaration of the transformations used to generate a track:

```
Box Type: 'tpcb'
Container: TrackBox ('trak'), only in a track that declares
at least one track reference type of type 'gtrk'.
Mandatory (per track): No
Quantity (per track): Zero or one
```

This box provides the list of transformations to be applied to samples from which the track generates:

```
aligned(8) class TransformPropertyContainer
extends FullBox ('tpcb', version, flags)
{
    unsigned int (8) num_entries;
    for (i=0; i<num_entries; i++) {
        TransformProperty property;
    }
}
``` with following semantics:

The flags parameter of this box is used to describe the kind of transformation. It also provides an indication on the complexity of these transformations. The flags values (with names and values below provided as examples) allow description at high level in the file of the different configurations depicted on FIG. 2. By doing so, a ISOBMFF parser or reader can easily check whether it can handle the generated track or not.

All static: indicates that all the contained TransformProperty boxes correspond to static transformations. Flag value is 0x000001. This means that the generated track contains no generated samples since they can all be generated from the TransformProperty indication.

All single input: indicates that all the contained TransformProperty boxes involve a single input track. Flag value is 0x000002. When the all single flags value is set the TransformPropertyContainer only contains TransformProperty boxes with version=1. When the all single flags value is not set, no conclusion can be drawn on the types of contained TransformProperty boxes. They can be all dynamic TransformProperty boxes (with version=2) or a mixture of static and dynamic transformations.

num_entries parameter indicates the number of consecutive transformations to apply to the input tracks samples to build the generated samples of the generated track.

In an alternative embodiment, the version parameter of the TransformPropertyContainer can be used to indicate the different configurations from FIG. 2. For example:

When version=1, the TransformPropertyContainer box only declares one TransformProperty box. As such, there is no need to provide the number of entries.

Combining version=1 with all_single_input flags indicates that the configuration (a) from FIG. 2 is in use. When all_single_input flags is not set, this signaling indicates configurations (a) or (c) on FIG. 2.

When version=2, the TransformPropertyContainer box declares more than one TransformProperty box. As such, the number of entries (number of TransformProperty in use to build the generated track) shall be provided. When combined with the flags' value all_single_input, this indicates the configuration (b) on FIG. 2. When all_single_input flags is not set, this signaling indicates configurations (a) or (c) on FIG. 2.

The box then rewrites into:

```
aligned(8) class TransformPropertyContainer
extends FullBox ('tpcb', version, flags)
{
    if (version == 1) {
        TransformProperty property;
    } else {
        unsigned int (8) num_entries;
        for (i=0; i<num_entries; i++) {
            TransformProperty property;
        }
    }
}
```

In an alternative embodiment the information contained in the flags value "all_static" can be given as a specific VisualSampleEntry in the SampleTableBox of a generated track indicating that the samples of this track are actually empty samples. For example using the reserved code: 'gtse' for generated track sample empty. Each transformation to apply to media samples is described by a TransformProperty box as follows (The TransformProperty is a generic box for declaration of common parameters to all specific kinds of transformation (other TransformProperty boxes that extend this generic TransformProperty box can provide the transformation parameters).

```
aligned(8) class TransformProperty (transform_type, version, flags)
extends FullBox(transform_type, version, flags)
{
    if (version == 1) {
        unsigned int(32) input_trackID;
    } else {
        unsigned int (8) num_inputs;
        for (i=0; i<num_inputs; i++) {
            unsigned int (32) input_trackID;
        }
    }
    if (flags & Transform_is_static) { // static parameters
        // A specific transform here may supply the transformation type
        and the parameters
        TransformationParameter parameter;
    } else { // dynamic parameters
        unsigned int (1) params_in_samples;
        unsigned int (7) reserved = 0;
        if (!params_in_samples) {
            unsigned int (32) param_track_ID;
        }
    }
}
```

For the case when the TransformProperty has dynamic parameters that are declared in the samples (the dedicated parameter "params_in_samples" in the TransformProperty box is set to 1), the transformation parameters are declared in the generated samples and stored in the media data box:

```
aligned(8) class GeneratedSample( ) {
    TransformationParameters parameter;
}
``` with the following semantics:

num_inputs specifies the number of input samples to the transformation.

input_trackID indicates the track_ID of the source track from which come the input samples to the transformation. When set to 0, indicates the output of the preceding transformation or operation.

params_in_samples indicates whether the transformation parameters are declared in the derived samples or not.

Optionally, an additional flag can indicate when params_in_samples=0 whether the transformation parameters are in another track in the same media file or in another track in a remote media file. In the latter case, this track can be reached for example through a data URL box in the DataEntryBox of the Generated Visual Track.

param_track_ID indicates the track_ID of the track declaring the transformation parameters (example parameter track 340). This track can be referenced by the generated visual track via a track reference type with a specific value, for example: 'dtrp' for Derived Track Parameters. (name and code here are just for example, any reserved code, not conflicting with other track reference types, is convenient).

In an alternative embodiment, instead of referring to the track_ID directly, a track_ref_index_or_zero parameter can be used: it is either a 1-based index to the TrackReferenceTypeBox of type 'gtrk', or the value 0 to indicate the output of the preceding ImageOperation. When using this way of referencing the input track, the generic TransformProperty with version=1 can even be empty since for version=1, there is only one input track and this track can easily be retrieved from the track reference box of the generated track. The TransformProperty box then rewrites as follows:

```
aligned(8) class TransformProperty (transform_type, version, flags)
extends FullBox(transform_type, version, flags)
{
    unsigned int (16) transfo_ID;
        if (version == 1) {
            unsigned int(8) track_ref_index_or_zero;
        } else {
            unsigned int (8) num_inputs;
            for (i=0; i<num_inputs; i++) {
                unsigned int (32) track_ref_index_or_zero;
            }
        }
    if (flags & Transform_is_static) { // static parameters
        // A specific transform here may supply the transformation type
    and the parameters
        TransformationParameter parameter;
    } else { // dynnamic parameters
        unsigned int (1) params_in_samples;
        unsigned int (7) reserved = 0;
        if (!params_in_samples) {
            unsigned int (32) param_track_ID;
        }
    }
}
```

As well, the param_track_ID parameter could be the index of the track reference type 341 with value "dtrp" that references a track providing the transformation parameters. Using the track reference type, coded on 8 bits, would lead to shorter description than the track_ID. One advantage of the track_ID is when the track is contained in an external or remote media file.

The transfo_ID is a unique identifier among all transformations that can be used to refer a declared TransformProperty.

In addition, still according to an embodiment of the invention, the flags of the TransformProperty can take the following values to give more information on the transformations to build the generated visual track:

Transform_is_static: Indicates that the TransformProperty has fixed parameters for a given track or track fragment. Flag value is 0x000001. A static TransformProperty contains the values of the parameters of the transformation to apply to an input sample. These are specified by one of the specific TransformProperty box, called TransformationParameter. When the flags value does not have this value set, then the TransformProperty box shall indicate where the transformation parameters are defined: in the generated samples, in a track in the media file or in a track outside the media file.

Transform_post_decoding: Indicates that the TransformProperty applies after decoding of the sample to generate. Flag value is 0x000002. A post-decoding TransformProperty requires the input sample(s) to be decoded before applying the transformation. When this flag is not set, the TransformProperty applies to compressed samples.

Transform_preserve_samples: Indicates that the number of samples obtained in the generated track (after application of the TransformProperty) will be the same as in the input track(s). Flag value is 0x000004. When this flag is not set, the generated track will contain a different number of samples than in input tracks.

In an alternative embodiment to the use of "version" parameter, several kinds of TransformProperty boxes are defined, inheriting from an abstract TransformProperty box. For example StaticTransformProperty box and DynamicTransformProperty box, respectively defining one trackID (when track_ID is used to reference the input track) or nothing (when the input track is implicitly referenced through the track reference box of the generated track) for the transformation operand and an ordered list of trackIDs (resp a 1-based index to the TrackReferenceTypeBox of type 'gtrk', or the value 0 to indicate the output of the preceding ImageOperation when the track reference box is used) for the transformation operands.

When the transformations to generate a visual track is a static transformation, the generated visual track may contain no generated samples, or at least empty samples. For such case, the SampleTableBox 'stbl' 313 then becomes optional and the generated visual track has a minimum set of metadata boxes, thus becoming more compact. In a preferred embodiment, the generated visual track only contains initialization data in the moov and track boxes and no data, the transformations being described in these boxes. In this preferred embodiment, the track header contains a specific value of the "flags" parameter to indicate that the track is an empty track (no sample data). This information could also be provided by any dedicated parameter in the track header box or sub-boxes like for example the all_static value explained with the semantics of the Transform Property box. An alternative embodiment is to define a more explicit and dedicated flags value of the track header box, like for example:

empty_samples: indicates that the track contains no sample data in media data box. The flags value is represented on a non-used bit in the 24 bits of the flags parameter (not conflicting with existing flags values). For example, the flags value can be 0x000016. When this non-used bit is set to 1, it means that the track contains no sample data in the media data box. The default value for this bit is 0. When this value is set, the track may declare in its SampleTableBox a specific VisualSampleEntry indicating that the samples are actually empty.

There may be cases where a track (whatever the track, not only generated track) has some samples that are empty (not all), for example, when the generated track does not consider all the samples from the input media tracks or when during a transmission one or more samples get lost or corrupted and then no data is stored for these samples. To signal at track header level such configuration, the following flags value is defined (the name of the value is just an example):

Partial_samples: indicates that some samples of the track may be empty or corrupted. The flags value is represented on a non-used bit in the 24 bits of the flags parameter (not conflicting with existing flags values). For example, the flags value can be 0x000032. When this non-used bit is set to 1, it means that the track contains samples with no data in the media data box. The default value for this bit is 0. Signaling this information at track level is useful for media players: to correctly handle media file with tracks having this flags value, they must be robust to missing data for some samples.

These flags are not limited to generated tracks. These flags can also be redefined in track fragments when the configuration of the track changes along time, for example in tf_flags value of the TrackFragmentHeaderBox 'tfhd'.

It informs a media player that the TransformationPropertyContainer 314 and its list of TransformProperty boxes (341-344) are sufficient to build the generated samples. Then, on FIG. 3, the media data box 320 has no data for generated samples.

In an alternative embodiment, the generated visual track 310 with static transformation still has an 'stbl' box 313. This 'stbl' box can contain a VisualSampleEntry indicating that the samples are empty, i.e. they don't have any data in the media data box 320. In this embodiment, the stbl box also contains a decoder configuration record.

In another alternative embodiment, the generated visual track 310 contains a stbl box 313 with all the mandatory boxes present for sample description (this to comply with players that would not be robust to missing mandatory boxes). In this case, the generated samples are declared to refer to a specific VisualSampleEntry. Each specific VisualSampleEntry, with its own four-character code indicates that the generated samples are actually empty_samples ('dtre'), full samples containing in their data the transformation parameters ('dtrf') samples, samples for which the transformation parameters are declared in another track than the input media files in the media file ('dtri') or in a remote track ('dtro').

When the generated visual track contains a SampleDescription box with a 'dtre' VisualSampleEntry, this means that there is no data for the derived samples, i.e. all the parameters are static and declared in the metadata boxes of the derived or generated visual track. As such the size for these samples are set to 0. The decoding and composition time stamps are those from the input tracks if the transform_preserve_samples flags value is set to 1. This specific VisualSampleEntry is declared as follows:

--- aligned(8) class DerivedEmptySampleEntry extends VisualSampleEntry ('dtre') {
EmptyDerivedTrackConfigRecord derived_config_rec; // mandatory
}

---

Where the derived_config_rec parameter is the following box:

---

Box Type: EmptyDerivedTrackConfigRecord
Container: DerivedEmptySampleEntry
Mandatory: Yes in a track containing a
DerivedEmptySampleEntry
Quantity: One
aligned(8) class EmptyDerivedTrackConfigRecord( )
extends Box ('dteC')
{
    TransformPropertyContainer transfo_list;
}

--- where transfo_list is the a TransformPropertyContainer box that declares the list of static TransformProperty box with their type and parameters.

Samples referencing this VisualSampleEntry are constructed using the list of transformation declared in this EmptyDerivedTrackConfigRecord. Alternatively the transfo-list can be declared directly at the visual sample entry level, without any intermediate EmptyDerivedTrackConfigRecord. When the TransformPropertyContainer box is declared at VisualSampleEntry level, it is no more needed to declare it at media handler or track header level.

When the generated visual track contains a SampleDescription box with a 'dtrf', VisualSampleEntry, this means that the samples of this track contains in their body or data the declaration of all the transformation parameters to apply onto the input samples to generate them. These sample data are stored in the media data box of the track. The samples to bytes offsets and samples to chunk offsets are set appropriately in the appropriate boxes of the SampleTableBox. This specific VisualSampleEntry is declared as follows:

--- aligned(8) class DerivedFullSampleEntry extends VisualSampleEntry ('dtrf') {
    FullDerivedTrackConfigRecord config_record; // mandatory
}

---

Where the config_record parameter is the following box:

---

Box Type: FullDerivedTrackConfigRecord
Container: DerivedFullSampleEntry
Mandatory: Yes in a track containing a DerivedFullSampleEntry
Quantity: One
aligned(8) class FullDerivedTrackConfigRecord ( ) extends Box ('dtfC') {
    TransformPropertyContainer transfo_list;
}

--- where transfo_list is an array of TransformProperty box with their type and no parameters since they are dynamic. At least one of these TransformProperty box is dynamic. The static one embed their transformation parameters while the dynamic ones have their transformation parameters in the sample data, then stored in the media data box:

--- aligned(8) class DerivedSample ( ) {
    TransformationParameter params [ ] ;
}

---

Samples referencing this VisualSampleEntry are constructed using the list of transformation declared in this FullDerivedTrackConfigRecord but the transformation parameters declared in the sample body. It is to be noted that in this case, the derived samples can mix static and dynamic transformations. Static ones can be referred through a unique transform_ID as well as dynamic ones followed by the appropriate parameter to apply.

When the generated visual track contains a SampleDescription box with a 'dtri' VisualSampleEntry, this means that the transformation parameters to build derive or generate these samples of this track are contained in a track present in the media file. For each sample to construct, the transformation parameters can be found in the corresponding sample in the indicated track (through a track_ID or the index of the track in the track reference type 341 indicating a track reference for transformation parameters).

This specific VisualSampleEntry is declared as follows:

```
aligned(8) class DerivedInBandSampleEntry extends VisualSampleEntry
('dtri') {
    InBandDerivedTrackConfigRecord config_record; // mandatory
}
```

Where the config_record parameter is the following box:

```
Box Type: InBandDerivedTrackConfigRecord
Container: DerivedInBandSampleEntry
Mandatory: Yes in a track containing a DerivedInBandSampleEntry
Quantity: One
aligned(8) class InBandDerivedTrackConfigRecord( ) extends Box
('dtiC')
{
    TransformPropertyContainer transfo_list;
}
``` where transfo_list is an array of TransformProperty box with their type and and eventually with some parameters, since dynamic. At least one of these TransformProperty box is dynamic and the parameter indicating that parameters are in sample is always false, meaning that the transformation parameters should be retrieved from a track in the media file. The Id of this track can be contained in the TransformProperty. This means that to generate or derive a sample, the input samples are transformed with the transformation parameters of the corresponding sample (same decoding time) in the parameter track.

When the generated visual track contains a SampleDescription box with a 'dtro' VisualSampleEntry, this means that the transformation parameters to build derive or generate these samples of this track are contained in an out-of-band track present in a remote file. For each sample to construct, the transformation parameters can be found in the corresponding sample of the indicated track (through a track_ID in a remote media file). Alternatively when media data box with identifier is available, this identifier can be used in the sample data to refer to the transformation parameters values in the remote track.

This specific VisualSampleEntry is declared as follows:

```
aligned(8) class DerivedOutOfBandSampleEntry extends
VisualSampleEntry
('dtro'){
    OutOfBandDerivedTrackConfigRecord config_record; // mandatory
}
```

Where the config_record parameter is the following box:

```
Box Type: OutOfBandDerivedTrackConfigRecord
Container: DerivedOutOfBandSampleEntry
Mandatory: Yes in a track containing a
DerivedOutOfBandSampleEntry
Quantity: One
aligned(8) class OutOfBandDerivedTrackConfigRecord( )
extends Box
('dtoC') {
    TransformPropertyContainer transfo_list;
}
``` where transfo_list is an array of TransformProperty box with their type and eventually with some parameters. At least one of these TransformProperty box is dynamic and the parameter indicating that parameters are in sample is always false, meaning that the transformation parameters should be retrieved from a track that is external to the media file. The Id of this track can be contained in the TransformProperty. This means that to generate or derive a sample, the input samples are transformed with the transformation parameters of the corresponding sample (same decoding time) in the external parameter track.

The last approach has the benefit to support both static and dynamic transformation and especially for dynamic transformations the case where some generated samples are empty, i.e. when the generated visual track does not have a one to one mapping with input samples (generated visual track may have only a subset of the transformed input samples). In such case, the generated visual track 310 has a SampleTableBox 313 defining at least two different VisualSampleEntry: one to declare generated samples for example with the reserved 'gtrk' code and one for declaring empty samples as explained above. Then each generated sample is declared as containing data in 320 or as empty by referring to one of these at least two different VisualSampleEntry. This kind of configuration can be signalled by the TransformProperty box's flags value: Transform_preserve_samples. To skip a sample in the generated visual sample, a specific TransformationParameter "no-op" is defined that simply consists in putting an empty sample at a given time. "No-Operation Transform Type"

```
Box Type: 'nopt'
Mandatory (per sample): No
Quantity (per sample): Zero or one
```

The "no-op" transform consists in the generation of an empty sample. When the no-op transform property is present in a sample, the other transform properties are ignored.
Syntax:

```
aligned(8) class NoOpTransform extends
TransformProperty('nopt') {
}
```

Finally, for dynamic transformation, with or without combination with static transformations, we have the following alternatives for partial mutualisation of the transformations description:
  All the transformation rules and parameters are static in one the metadata box of the track and the track has no generated samples (the track is then marked as having empty samples)
  The transformation parameters are reflected in specific VisualSampleEntry listed in the SampleTableBox 313, each generated sample referring to one of these VisualSampleEntry.
  The transformation parameters are simply declared in the samples, put in media data box 320.
  The transformation parameters are declared in an external track, for example a timed metadata track.
  The flexibility of the design depicted in FIG. 3 and exposed above allows to combine various description possibilities and to cover both static and dynamic transformation and mix of them in the same generated visual track.

The goal of the Transform_post_decoding value for the Transform Property "flags" parameter, is to reduce the number of decoding operations. When encapsulating the content, the author knows which transformation it applies and how it builds the samples: with such flag, the content author can do as many transformation as possible in the compressed domain and then decode the generated sample the latest as possible so as to avoid composition in the pixel domain and to have multiple decodings and storage of intermediate samples.

Depending on the complexity of track transformations declared in a media file, for example through the "version" parameter of the TransformProperty or of the TransformPropertyContainer box, a brand or compatible brand at the beginning of the media file, for example in ftyp box can rapidly indicate to media players the degree of complexity for the generated tracks in the file. For example, two brands can be defined 'dtrs" and "dtra" respectively for single track generation or transformation and for advanced (i.e. multi-track) generation or transformation. The former corresponds to media files (or segments) that only contains TransformProperty boxes with version=1 or any equivalent parameter that indicates that the transformations or operations to derive the samples only take one single track as input. The latter corresponds to media files (or segments) that contains TransformProperty boxes with version=2 or any equivalent parameter that indicates that the transformations or operations to derive the samples can contain more than one input track (i.e multi track transformations). An alternative definition of brands can be one brand per configuration of the FIG. 2. For example, a brand 'dtr1' indicates a media file that contain simple derived tracks computed from a single input track consisting in a single operation (configuration 2 (a)). This means that according to a previous embodiment, the TransformationPropertyContainer box is a version=1 box (or any parameter indicating that it contains a single transformation or operation). Following the same principle, other brands can be defined depending on the number of input tracks and on the number of operations or transformation to apply to the input tracks. Depending on its capabilities, the client can then decide to process only the media tracks (none of the generated tracks), some of the generated tracks (ex: those with simple operations) or can support all generated tracks. The process by the client can consist in filtering the track while parsing the media file or in streaming scenario to never select such complex or unsupported generated track.

An alternative embodiment, especially relevant when different transformations apply to different samples, but respecting a given pattern of samples, typically when the transform_preserve_samples flags' value of the generated track is not set is to use group of samples and associate each group of samples to a transformation or a set of transformation. Patterns of samples (or groups of samples) are defined and different transformations properties (VisualSampleTransfoEntry) are applied to these groups of samples or pattern of sample. A SampleToTransformBox is defined with a transformation_type. SampleToTransformBox and Sam pleTransfoDescriptionBox are associated through this transformation_type. A VisualSampleTransfoEntry then contains at least an operator and parameters for this operator. For example: operator=rotation and parameter (angle=90°). In other words, a VisualSampleTransfoEntry can correspond to one of the specific TransformProperty box.

Figure 4:
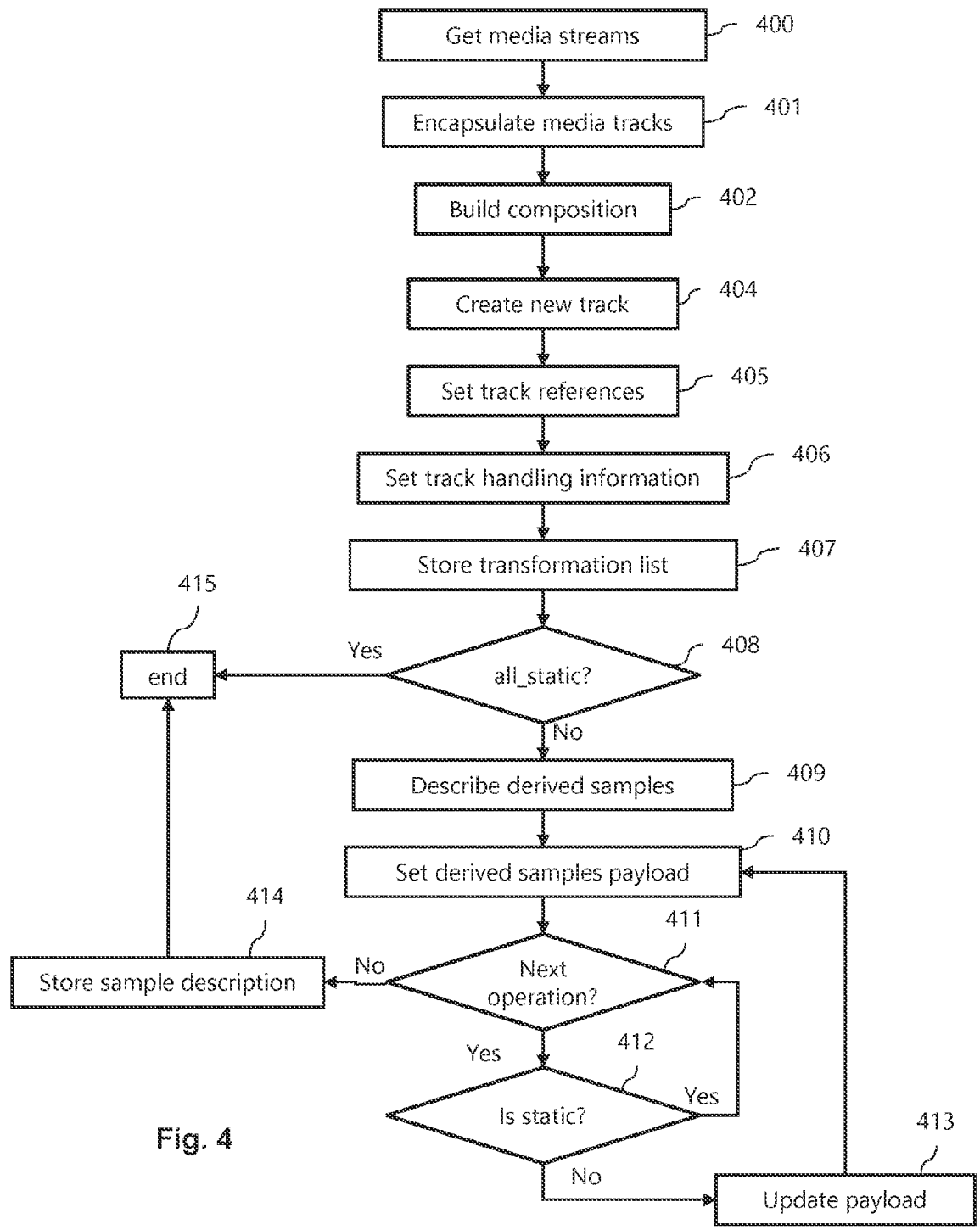
FIG. 4 illustrates a flowchart representing a method for encapsulating a media file containing one or more generated visual tracks according to an embodiment of the invention.

FIG. 4 illustrates a flowchart representing a method for encapsulating a media file containing one or more generated visual tracks according to an embodiment of the invention.

This consists in an encapsulation of media streams produced by the media encoders 100 of FIG. 1, in particular by one video encoder according to ISO Base Media File Format. The input media streams are received by the media packager 101 during a step 400, The media packager 110 packages each media stream into one or more ISOBMFF tracks or track fragments during step 401. As a result of the step 401, a media file, a fragmented media file or a set of media segments are produced. Then a user or the content creator himself can check the produced media and creates additional tracks representing alternative or modified views of the media content. This step is summarized as composition step 402. It consists in selecting one or more input tracks from the encapsulated media tracks and to define effects, transformations or operations to apply onto the selected tracks so as to produce, to generate, a different track.

During the composition, the user has many possibilities and choices in transforming the media tracks, for example:
  selecting input samples from one or from multiple media tracks
  selecting one or more operations to apply to input samples
  applying the same or different transformation parameters to selected input samples
  transforming each selected sample or a subset of selected samples.

When the user has completed the composition, he can decide to record the results of his composition in the same file as the input media tracks.

It is to be noted that the composition unit 130 and the composition construction step 402 can also be integrated in the media packager 110 and pre-recorded as automatic transformation to apply to recorded media streams: for example, a rotation of the video tracks, a pre-defined cropping or resizing of the video or any operation planned in advance or offered by the packaging device.

When the user decides to record or if the media packager is configured to automatically create a generated track, the ISOBMFF writer 113 initiates a new track in the media file at step 404 by inserting a 'trak' box under the main 'moov' box. This track box will contain the description of the generated track representing the composition. A track header box 'tkhd' is created with a new track_ID allocated for this new track. The ISOBMFF writer than describes in this track header box the creation time, and the dimensions (width and height) of the generated track. This information can be obtained from the composition unit and/or parameterized by the user.

Then, a track reference box 'tref' is created in a step 405 to link the generated track to the one or more input media tracks from which it generates with a track reference type equal to 'gtrk' to indicate that the track "is generated from" the referenced track. Optionally at the same step 405, the generated track and the input media tracks are also associated to the same track group through a TrackGroupBox 'trgr' with a specific grouping type value indicating that each track of the group is a variation of an original media track.

Then, at step 406, the ISOBMFF writer describes the media data and how to handle the generated track. This is done in a Track Media 'mdia' box, and, in particular, in the HandlerBox 'hdlr' sub-box. The handler_type is set to 'vide' if the generated track is generated from visual tracks or to 'soun' if the generated track is generated from audio input tracks. It could even be extended to other media types, the handler should then be set to the handler type of the input tracks for generation. Optionally in the HandlerBox, the name is set to "generation", so that a human inspecting the track can clearly see the purpose of this track. Depending on the handler_type value, the media-specific handler information is set during the same step 406. When the generated tracks are generated from input video tracks, a specific VideoMediaHeaderBox 'vmhd' is added to the track description and extended so as to declare the list of transformations involved in the track generation. To distinguish from existing VideoMediaHeaderBox and to preserve backward compatibility, the specific VideoMediaHeaderBox for generated tracks uses a version="1":

```
aligned(8) class VideoMediaHeaderBox
    extends FullBox('vmhd', version = 1, 1) {
    template unsigned int(16) graphicsmode = 0; // copy, see below
    template unsigned int(16) [3] opcolor = {0, 0, 0};
    TransformPropertyContainerBox transform_list;
}
```

The specific VideoMediaHeaderBox actually requires two parameters: the indication that it is not the usual VideoMediaHeaderBox (the example of the version=1 value above) and a TransformPropertyContainer box (that declares the list of transformation used for the generation of the track).

Depending on the user's choices regarding the composition construction, the flags and version values of the TransformPropertyContainerBox and the list of TransformPropertyContainer boxes are set according to the description related to FIG. 3. This is done at step 407. In case of all-static transformations, tested in a step 408, then the description of the generated track ends here in a step 415, meaning that no SampleTableBox is declared. If at least one of the transformation used to generate the track is not static, then a SampleTableBox is created to describe how the generated samples can be computed in step 409. This consists in case of dynamic parameters to set the appropriate VisualSampleEntries in the Sample Description box and when the transformation parameters are stored in the generated samples, the data for the generated samples is computed (the transformation parameters for the given sample) and stored in memory of the media packager in a step 410.

The ISOBMFF writer iterates through the list of operations or transformations declared in the generated track in a test step 411. Each time the next operation or transformation is a dynamic transformation, corresponding to test 412 false, the generated sample is updated with the current operation parameters.

In order to support both static and dynamic parameters, each time a static operation is encountered, the payload of the generated samples is updated with an identifier to the static transformation to apply in step 413. Once the list of operations is reached for a sample, the sample description (size, byte and or chunk offset in the data box, decoding and or composition times are update in the appropriate sample description related boxes in a step 414.

For really simple static transformation on a single input track that can be handled by the transformation matrix of the track header, the generated track is declared with empty_samples and defines as single operation the Identity Transform Property "idtt". The transformation parameters are then declared in the transformation matrix of the track header box of the generated track.

It is recommended to declare transformation in order of operations, starting with pre-decoding transformation first, so that the number of decoding operations and storage of intermediate samples remain as limited as possible.

The produced file or segment can be further placed on a streaming server for distribution, for example with adaptive streaming over HTTP.

When content is prepared for adaptive streaming on HTTP, some or all the generated visual tracks can be exposed in a streaming manifest. For example, when mapped to the manifest for MPEG DASH streaming protocol (the Media Presentation Description), a generated visual track is exposed as a Representation with an attribute dependencyId referencing all the input tracks to indicate the Representations required to decode and reconstruct the generated track. Optionally, the relation between the Representation of the generated visual track and the Representations for its input video tracks can be qualified with the 'gtrk' reference type. This can be done using a dependencyType attribute or declaring an associationId and associationType between these Representations. This allows a media streaming client selecting a Representation corresponding to a generated visual track for rendering to be informed that the segments for the input tracks should also be streamed.

Figure 5:
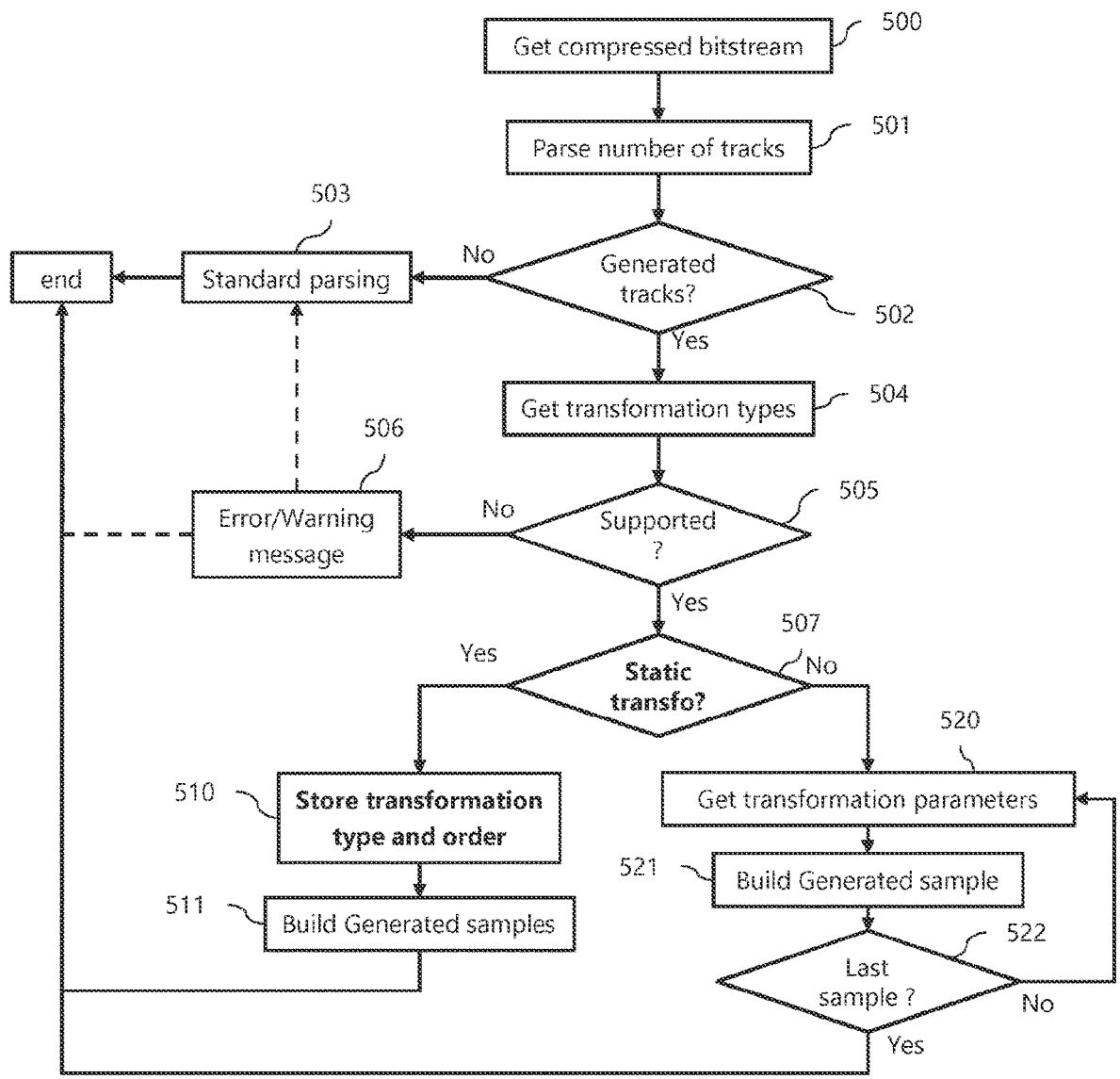
FIG. 5 illustrates the parsing of a media file or media segments according to an embodiment of the invention.

FIG. 5 illustrates the parsing of a media file or media segments according to an embodiment of the invention.

This description applies both when the file is entirely available to the media client 150 or when it is streamed to the media client 150. The processing of the media file starts with the reception of the initialization data of the media file in a step 500. From this initialization data, the ISOBMFF parser 152 parses the moov box and determines, in a step 501, the number of tracks contained in the file with their type (video, audio, metadata, text . . . ).

Then, in a step 502, it parses the relationships between all these tracks if at least one track reference contains at least one 'gtrk' track reference type to another track, then the file not only contains media data tracks but also generated tracks. The parser then needs to determine whether to expose those generated tracks to the user. It is to be noted that some generated tracks may be indicated as not intended to be display (ex: when the track header's flags value does not have the Track_in_movie value that is set), for example when used as intermediate step in a complex generation. In such case, these are not exposed to the client for selection and playback. To determine which tracks to expose to the user, the parser looks at the list of Transform Property boxes declared for the generated track. Just by parsing the type of the transformation in step 504, the parser can determine, in a step 505, whether it will be able to reconstruct or not the generated track.

As soon as one transformation type is not supported or available in the media client, the generated track is not processed. A warning can be displayed to a user through a graphical user interface or the sent to the application using the media parser, for example a streaming application that then decides to select or switch to a supported track. It is to be noted that in case of fragmented tracks, the initialization data can be updated in moof boxes, then these first steps are performed again. It is to be noted that supporting or not a generated track can also be obtained through ISOBMFF specific brand or streaming profile or any descriptor informing on the presence of transformation, when the media file is described in a streaming manifest like for example DASH MPD.

When the transformations declared in a generated track are supported by the media player or media client then the parser 152 checks whether all the transformations are static in a step 507. This information can be obtained by parsing the flags value in the track header box of the generated track, or by looking version or flags value of the TransformPropertyContainer box or by going through the list of declared TransformProperty box for the generated track and checking their flags and version values.

For the static transformations, the parser stores in client memory the operator and the transformation parameters in a step 510. When all transformation are static and the generated track is marked as empty_samples, then the parser can start building the generated samples in a step 511, by applying one after the other the transformation operators using their parameters to the input samples. The input samples have been determined by parsing the Transform-Property box for the generated track.

When at least some transformations are dynamic, meaning the test step 507 is false, the parser checks whether the transformation parameters are in the generated samples, in another track contained in the media file or in an external track. Then it starts building the samples one by one in a step 521 until the last input sample to process, tested in a step 522.

Figure 6:
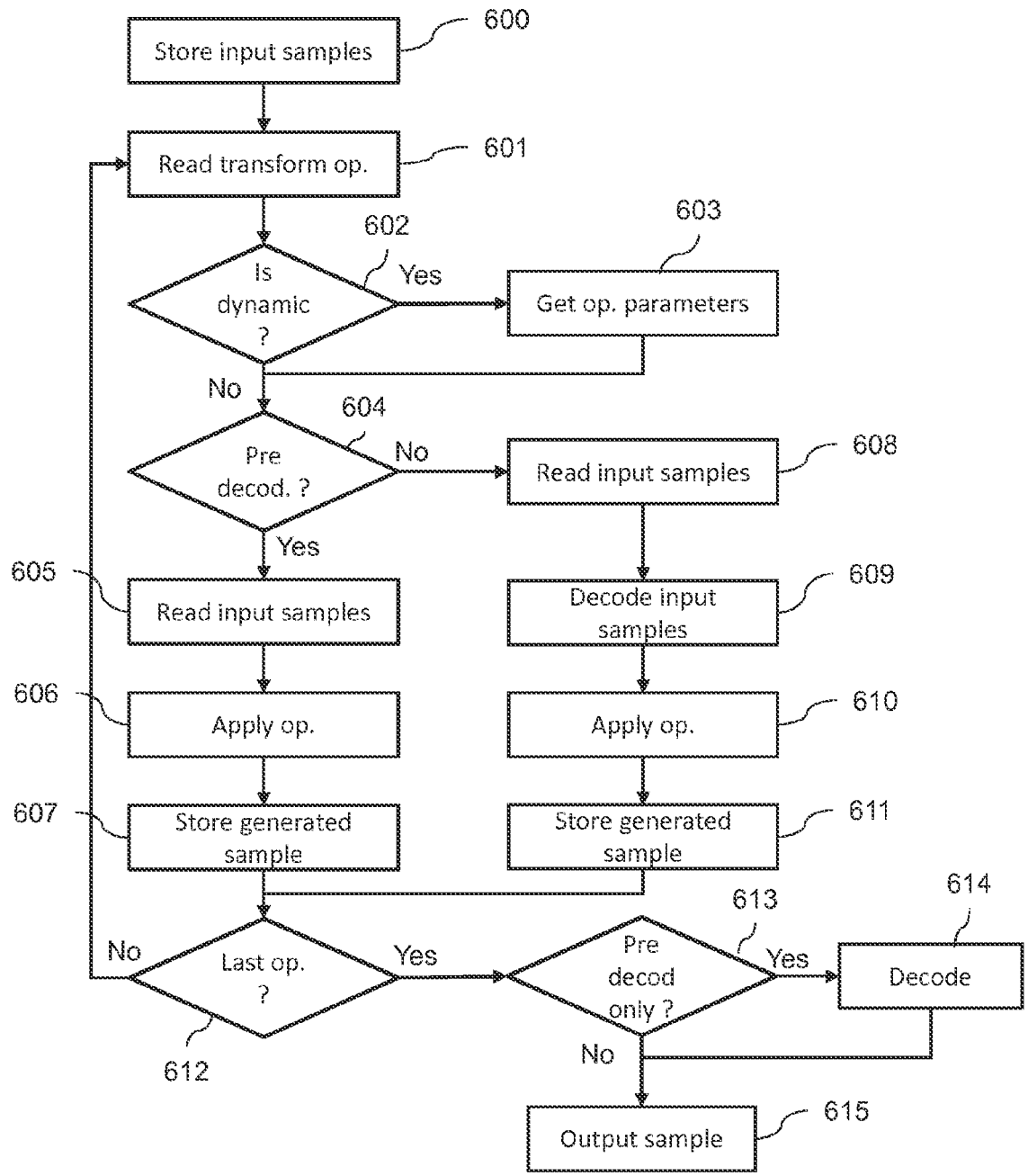
FIG. 6 illustrates the generation of a sample in an embodiment of the invention.

FIG. 6 illustrates the generation of a sample in an embodiment of the invention.

This method assumes that input tracks have been identified and the set of transformation operators has been read. The process is supposed to loop on the successive samples to be generated and focus on the process for a given sample.

In a step 600, the input samples are read and stored at the beginning of the process. It is worth noting that while using the plural, there might be only one input track and therefore one input sample.

In a step 601, the first transformation operator is read.

In a step 602, it is tested if the current transformation operator is static or dynamic.

In case the transformation operator is dynamic, the parameters of the operator must be obtained in a step 603. They might be obtained from the associated sample in the generated track or in a reference parameter track (either local or remote). In case the transformation operator is static, the parameters of the transformation operator are the same for all samples and assumed to be known at this stage of the processing.

In a step 604, it is tested if the transformation operator is supposed to apply to the encoded samples or to the decoded ones. It is assumed here that the list of transformation operators may contain only "pre-decoding" operators, only "post-decoding" operators or both. When both are contained in the list, advantageously, the list contains first only "pre-decoding" transformation operators followed by only "post-decoding" transformation operators. Accordingly, the input samples will be decoded only once.

In case the current transformation operator is a "pre-decoding" operator, the input encoded samples are read in a step 605. For the second and further "pre-decoding" transformation operators to be applied, the input encoded samples are actually the generated encoded sample stored resulting from the application of the previous transformation operator. The current transformation operator is then applied to the input encoded samples in a step 606 to obtain a generated encoded sample that is stored in a step 607.

In case the current transformation operator is a "post-decoding" operator, the input samples are read in a step 608. For the second and further "pre-decoding" transformation operators to be applied, the input decoded samples are actually the generated decoded sample stored resulting from the application of the previous transformation operator.

Then, only for the first "post-decoding" transformation operator, the input samples are encoded and must be decoded in a step 609. This is because a "post-decoding" transformation operator, by definition, must be applied to decoded samples. In subsequent loop, the decoding step 609 is not executed.

The current transformation operator is then applied to the input decoded samples in a step 610 to obtain a generated decoded sample that is stored in a step 611.

Is a step 612, it is tested if the end of the list of transformation operators has been reached. If not, the process loop back to the next operators in step 601.

When all transformation operators have been applied, it is tested in a step 613 is there was only "pre-decoding" operators. In that case, the current generated sample is encoded and need to be decoded in step 614 before being ready to be output in a step 615.

When an input media track to a transformation operator has dependencies to other tracks, for example through extractors (explicit reconstruction) or for implicit reconstruction of its samples, then the input sample provided to the transformation consists in the reconstructed sample after following the reconstruction. This applies for post-decoding operations or transformations. For pre-decoding operations, the input sample is formed by the concatenation of the sample data including the sample itself plus the data resulting from the reconstruction rule resolution. For example, in case of scalable video with dependencies of an enhancement layer sample to a base layer sample, an input sample will consist in the concatenation of the enhancement plus base sample data when the transformation is pre-decoding transformation. As well, the input sample for a post-decoding transformation will be the reconstructed/decoded input sample made up of the base plus enhancement sample.

FIG. 7 represents a block diagram of a server or a client device 700 in which steps of one or more embodiments may be implemented.

Preferably, the device 700 comprises a communication bus 702, a central processing unit (CPU) 704 capable of executing instructions from program ROM 706 on powering up of the device, and instructions relating to a software application from main memory 708 after the powering up. The main memory 708 is for example of Random Access Memory (RAM) type which functions as a working area of CPU 704 via the communication bus 702, and the memory capacity thereof can be expanded by an optional RAM connected to an expansion port (not illustrated). Instructions relating to the software application may be loaded to the main memory 708 from a hard disk (HD) 710 or the program ROM 706 for example. Such software application, when executed by the CPU 704, causes the encapsulation step described with reference to FIGS. 4 to 6 to be performed in the server.

Reference numeral 712 is a network interface that allows the connection of the device 700 to the communication network 714. The software application when executed by the CPU 704 is adapted to react to requests received through the network interface and to provide data streams and requests via the network to other devices.

Reference numeral 716 represents user interfaces to display information to, and/or receive inputs from, a user.

It should be pointed out here that, as a variant, the device 700 for managing the reception or sending of multimedia bit-streams can consist of one or more dedicated integrated circuits (ASIC) that are capable of implementing the method as described with reference to FIGS. 4 to 6. These integrated circuits are for example and non-restrictively, integrated into an apparatus for generating or displaying video sequences and/or for listening to audio sequences.

Figure 8:
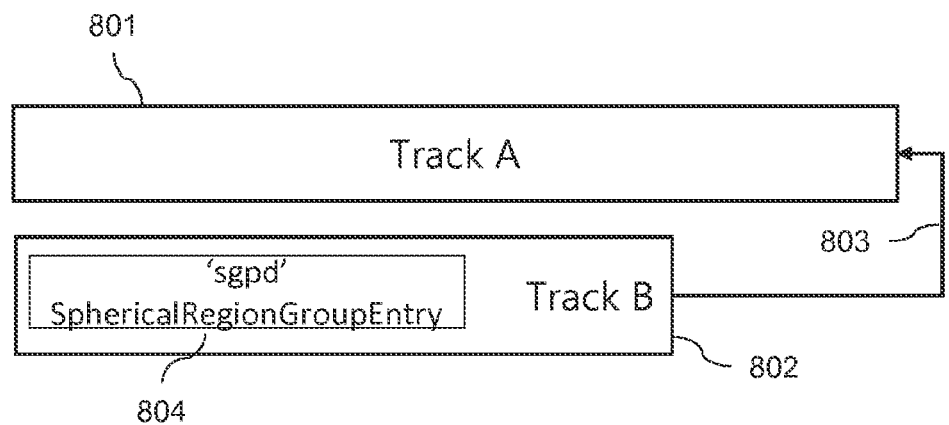
FIGS. 8 and 8b illustrate an encapsulation process for a video corresponding to a wide view of a scene along with an extraction of this wide view of the scene in an embodiment of the invention.
Figure 8:
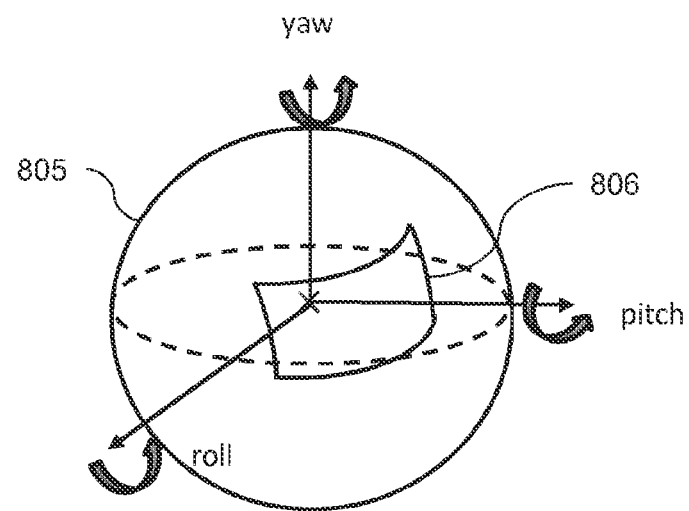

FIG. 8 illustrates an encapsulation process for a video corresponding to a wide view of a scene along with an extraction of this wide view of the scene in an embodiment of the invention.

The wide view of the scene is typically a spherical 360° media content.

The wide view of the scene will be encoded and encapsulated in at least one track 801. The video representing an extraction from this wide view is encoded and encapsulated in a specific track 802 which contains a reference 803 to the wide view track and a descriptor 804 of the extracted part in the wide view video.

This descriptor may be use as one of the transformation operator allowing signalling a spatial portion of a capturing projection.

The descriptor 804 typically gives location parameters to identify the extracted part 806 in the wide view video 805. Typically, these parameters are related to yaw, pitch and roll parameters.

For example, the descriptor 804 may take the following syntax as a specific VisualSampleGroupEntry:

```
class SphericalRegionGroupEntry( ) extends
VisualSampleGroupEntry ('srif')
{
   unsigned int(16) region_id;
   unsigned int(16) yaw_center;
   unsigned int(16) pitch_center;
   unsigned int(16) roll_center;
   unsigned int(16) yaw_range;
   unsigned int(16) pitch_range;
}
``` with the following semantics:

yaw_center specifies the value of yaw that corresponds to the center in the projection image, in increments of 0.01 degrees. The values of yaw_center shall be in the range of −18000 and 17999. When not present, the value of yaw_center should be inferred to be equal to 0.

pitch_center specifies the value of pitch that corresponds to the center in the projection image, in increments of 0.01 degrees. The values of pitch_center shall be in the range of −9000 and 9000. When not present, the value of pitch_center should be inferred to be equal to 0.

roll_center specifies the value of roll that corresponds to the center in the projection image, in increments of 0.01 degrees. The values of roll_center shall be in the range of −18000 and 18000. When not present, the value of roll_center should be inferred to be equal to 0.

yaw_range specifies the range of values of yaw that are present in the projection image, in increments of 0.01 degrees. The values of yaw_range shall be in the range of 1 and 36000. When not present, the value of yaw_range should be inferred to be equal to 36000.

pitch_range specifies the range of values of pitch that are present in the projection image, in increments of 0.01 degrees. The values of pitch_range shall be in the range of 1 and 18000. When not present, the value of pitch range should be inferred to be equal to 18000.

When a track is a viewport of another track, it contains a 'tref' box with one 'tile' reference type to the full track representing the whole sphere.

In a preferred embodiment, the descriptor 804 contains more descriptive parameters:

```
class SphericalRegionGroupEntry ( ) extends
VisualSampleGroupEntry
('srif')
{
   unsigned int(16) region_id;
   unsigned int(1) full_picture;
   if (full_picture)
      bit(7) reserved = 0;
   else {
      unsigned int(1) dynamic_viewport;
      bit(6) reserved = 0;
      if (dynamic_roi) {
         unsigned int(32) track_ID;
      } else {
         unsigned int(16) yaw_center;
         unsigned int(16) pitch_center;
         unsigned int(16) roll_center;
         unsigned int(16) yaw_range;
         unsigned int(16) pitch_range;
      }
   }
}
``` with the following semantics (aligned with the ones in Omnidirectional projection indication SEI message in HEVC):

region_id is a unique identifier for all spherical region sample group descriptions that relate to the same visual source. All spherical region sample group descriptions having the same region_id share the same reference spherical space.

full_picture, when set, indicates that this spherical region sample group description represents actually a complete spherical picture representing the same visual content formed at least by the union of all sample group description of type 'srif' with the same region_id.

dynamic_viewport, when set, indicates that the coordinates of the spherical region are provided via a metadata track identified by track_ID. Otherwise, the coordinate of the rectangular region are provided by yaw_center, pitch_center, roll_center, yaw_range and pitch_range.

track_ID indicates a metadata track containing timed spherical coordinates describing the coordinates for each sample of the spherical region represented by the spherical region sample group description.

yaw_center specifies the value of yaw that corresponds to the center in the projection image, in increments of 0.01 degrees. The values of yaw_center shall be in the range of −18000 and 17999.

pitch_center specifies the value of pitch that corresponds to the center in the projection image, in increments of 0.01 degrees. The values of pitch_center shall be in the range of −9000 and 9000.

roll_center specifies the value of roll that corresponds to the center in the projection image, in increments of 0.01 degrees. The values of roll_center shall be in the range of −18000 and 18000.

yaw_range specifies the range of values of yaw that are present in the projection image, in increments of 0.01 degrees. The values of yaw_range shall be in the range of 1 and 36000.

pitch_range specifies the range of values of pitch that are present in the projection image, in increments of 0.01 degrees. The values of pitch_range shall be in the range of 1 and 18000.

It is to noted that the format of spherical coordinates timed metadata track are redefined as specific MetadataSampleEntry as follows:

Spherical coordinates Sample Entry
Sample Entry Type: 'spcc'
Container: Sample Description Box ('stsd')
Mandatory: No
Quantity: 0 or 1

The Spherical coordinates sample entry provides spatial information related to the referenced track expressed in a spherical coordinate system.

Syntax

The Spherical coordinates sample entry shall be as follows:

```
aligned(8) class SphericalCoordinatesSampleEntry
    extends MetadataSampleEntry ('spcc') {
    unsigned int(16) projection_type;
}
```

Semantics projection_type indicates the particular mapping of the rectangular decoder picture output samples onto the coordinate system.

Spherical coordinates Sample format

Syntax

The Spherical coordinates sample shall conform to the following syntax:

```
aligned(8) class SphericalCoordinatesSample( ) {
    unsigned int(16) yaw_center;
    unsigned int(16) pitch_center;
    unsigned int(16) roll_center;
    unsigned int(16) yaw_range;
    unsigned int(16) pitch_range;
    unsigned int(1) interpolate;
    unsigned int(7) reserved;
}
```

Sync samples for ROI metadata tracks are samples for which the interpolate value is 0.

Semantics yaw_center specifies the value of yaw that corresponds to the center in the projection image, in increments of 0.01 degrees. The values of yaw_center shall be in the range of −18000 and 17999.

pitch_center specifies the value of pitch that corresponds to the center in the projection image, in increments of 0.01 degrees. The values of pitch_center shall be in the range of −9000 and 9000.

roll_center specifies the value of roll that corresponds to the center in the projection image, in increments of 0.01 degrees. The values of roll_center shall be in the range of −18000 and 18000.

yaw_range specifies the range of values of yaw that are present in the projection image, in increments of 0.01 degrees. The values of yaw_range shall be in the range of 1 and 36000.

pitch_range specifies the range of values of pitch that are present in the projection image, in increments of 0.01 degrees. The values of pitch_range shall be in the range of 1 and 18000.

interpolate indicates the continuity in time of the successive samples. When true, the application may linearly interpolate values of the ROI coordinates between the previous sample and the current sample. When false, there shall not be any interpolation of values between the previous and the current samples.

As well, for 2d images, a descriptor for rectangular regions as a RectRegionSampleGroupEntry ('rrif') is defined. (name and code are here just for example, could also be 'tile' or 'part', any reserved 4-character code). This descriptor is identified by a specific reserved code, for example 'rrif'. The rectangular region sample group description is used to describe the spatial relationship between video or image media tracks. It allows identifying that decoded samples of a track spatially correspond to a given rectangular area in another track.

```
class RectRegionGroupEntry( ) extends
VisualSampleGroupEntry ('rrif')
{
    unsigned int(16) region_id;
    unsigned int(16) region_width;
    unsigned int(16) region_height;
    unsigned int(1) full_picture;
    if (full_picture)
        bit(7) reserved = 0;
    else {
        unsigned int(1) dynamic_roi;
        bit(6) reserved = 0;
        if (dynamic_roi) {
            unsigned int(32) track_ID;
        } else {
            unsigned int(16) horizontal_offset;
            unsigned int(16) vertical_offset;
        }
    }
}
``` with the following semantics:

region_id is a unique identifier for all rectangular region sample group descriptions that relate to the same visual source. All rectangular region sample group descriptions having the same region_id share the same reference rectangular space.

full_picture, when set, indicates that this rectangular region is actually a complete picture representing the same visual content formed at least by the union of all sample group description of type 'rrif' with the same region_id, in which case region_width and region_height shall be set to the width and height of the reference region.

dynamic_roi, when set, indicates that the coordinates of the rectangular region are provided via a metadata track identified by track_ID. The format of 2D Cartesian coordinates timed metadata track as specified in clause 6 of ISO/IEC 23001-10 shall be used in which case region_width and region_height shall be set to the reference_width and reference_height as provided in 2D Cartesian coordinates sample entry. Otherwise, the coordinate of the rectangular region are provided by horizontal_offset, vertical_offset, region_width and region_height.

track_ID indicates a metadata track containing timed 2D Cartesian coordinates describing the coordinates for each sample of the rectangular region represented by the rectangular region sample group description.

horizontal_offset and vertical_offset give respectively the horizontal and vertical offsets of the top-left coordinate of the rectangular region represented by the rectangular region sample group description, relative to the top-left coordinate of the reference region. The reference region is the region formed by the union of all sample group description of type 'rrif' with the same region_id.

region_width and region_height give respectively the width and height of the rectangular region represented by the rectangular region sample group description, in integer coordinates, or respectively the width and height of the reference rectangular space when full_picture or dynamic_roi are set.

It is to be noted that the units used to describe the region size are arbitrary units and may correspond to video pixel resolution, but don't have to.

In an alternative embodiment, 'srif' and 'rrif' descriptors also contain a unique identifier as additional parameter. This identifier allows applications to reference the descriptors via the identifier's value. The identifier could be the group_ID defined below.

These new descriptors and the existing tile descriptor 'trif' in ISO/IEC 14496_15 can then be used in new specific TransformProperty in addition to simple crop or rotate operations. This can be useful to for ROI or viewport selection or extraction. For example a specific TransformProperty is proposed to perform static ROI extraction from encapsulated HEVC tracks using the trif descriptor:

Static ROI Selection
Box Type: 'sroi'
Mandatory (per sample): No
Quantity (per sample): Any The static ROI selection is a transform property that defines a ROI extraction.

```
aligned(8) class StaticROISelection
extends TransformProperty('sroi') {
    unsigned int (16) tileRegion_ID;
}
```

This transformation is declared as a static TransformProperty applying to a single input track. The parameter, tileRegion_ID, indicates the parser to extract the NAL units or samples associated to a tile region descriptor having this tileRegion_ID. The same would apply for a static viewport in spherical content. Depending on pre-decoding or post-decoding flags value, the operation consists in a sub-bitstream extraction from the input track or to a decode and crop operation. This depends on the independency of the encapsulated tile regions described with trif. When independent, the TransformProperty can be set to pre-decoding transformation, to post-decoding otherwise.

Other parameters can be given, for example x, y, w, h instead of a tileRegion_ID value. This is however less convenient for a parser that has to match the parameters with the one in the different trif sample groups.

For multi-track TransformProperty, the parameter can consist in a list of tileRegionId. For example:

```
aligned(8) class MultiROISelection
extends TransformProperty('mroi')
{
    unsigned in (16) num_entries;
    for (i=0<i<num_entries; i++{
        unsigned int (16) tileRegion_ID;
    }
}
```

To generalize these kinds of transformations a Selection operator can be defined as follows:

```
aligned(8) class SelectionProperty
extends TransformProperty('extr')
{
    unsigned in (16) grouping_type;
    unsigned in (16) num_entries;
    for (i=0<i<num_entries; i++{
        unsigned int (16) group_ID;
    }
}
```

Where grouping_type indicates the criterion to select NAL units or samples from the one or more input tracks. This can be rrif, srif, trif, rap (to select on random access samples in a track) . . . and the group_ID provide the exact groupID from which to extract. It is up to the content creator to set appropriately the static/dynamic information and the single/multi-track and the pre-decoding/post-decoding parameters during the composition step within the composition unit 130.

In other words, it is proposed a method for providing encapsulated media data which comprises samples, by a first device, said media data comprising first media data representing a capturing projection of a wide view of a scene, and second media data corresponding to a spatial portion of said capturing projection, said method comprising:

Encoding the first and second media data;

Encapsulating the encoded first media data in one first track;

Encapsulating the encoded second media data in one second track, said second track including a second header;

Providing one parameter in said second header, for referencing the first track.

The parameter may be associated with a type signaling a spatial portion, for example a tile.

The parameter may be included in a box, whose type is a 'tile' reference type.

The parameter may be a descriptor, for example a VisualSampleGroupEntry descriptor like the SphericalRegionGroupEntry or the RectRegionGroupEntry.

The tracks corresponding to a part and the full picture track are all set and defined in a track group box 'TrackGroupTypeBox' for example, (related to a "track group") with a new track grouping type. A flag for signalling a full picture could be a flag associated with specific particular track_group_type:

```
RegionVideoGroupBox extends FullBox('part', version = 0, flags = 0)
{
    unsigned int(32) track_group_id;
    unsigned int(1) full_track;
    bit(7) reserved;
}
```

Where the full_track indicates whether a track pertaining to the track group corresponds to the full video track and 'part' is the track grouping_type (name here is just for example, any 4-character code reserved for this purpose can be used).

'part' (or any other reserved 4-character code) indicates that a track having this track group box in its 'trak' box belongs to a composition made with several tracks (multi-track composition). The tracks that have the same value of track_group_id within a TrackGroupTypeBox of track_group_type 'part' are mapped as being spatial parts, or sub-pictures from the same source. For example, an ultra-high definition recording of a video may have several video tracks in high definition, each for a different spatial part of the ultra high resolution video to encode. Then, video tracks having a track_grouping_type='part' will have the same value of track_group_id.

More generally, new metadata for track group description or new track grouping types can be used to describe a set of tracks intended to be composed, rendered or displayed together. According to an embodiment, of the invention, it is proposed to provide different kinds of track group signalling depending on whether the content creator packaging the video tracks into a media file allows the media players to:

render the tracks pertaining to the group at their original position and sizes (as on FIG. 11-1161): implicit composition (1141). It is implicit since the composition parameters, mainly positions and sizes, are the values already stored in the track's descriptive metadata 1142 (for example in track header, sample entries, sample group descriptions . . . ). The object of the track group description is to describe the relationships of the different tracks in their original context. An example of such track group is described in reference to FIG. 10-1001.

render the tracks at any position, potentially changing their positions and/or sizes (as on FIG. 11-1162): explicit composition (1151). The object of the track group description is then to describe the purpose of the track group (through track_grouping_type) and also the composition parameters 1152. An example of such track group is described in reference to FIG. 10-1002. This can be seen as an alternative to derived tracks. The difference with derived tracks is that the generated visual track is not physically present in the encapsulated file but only instructions (1152) on how to build it.

Figure 8B:
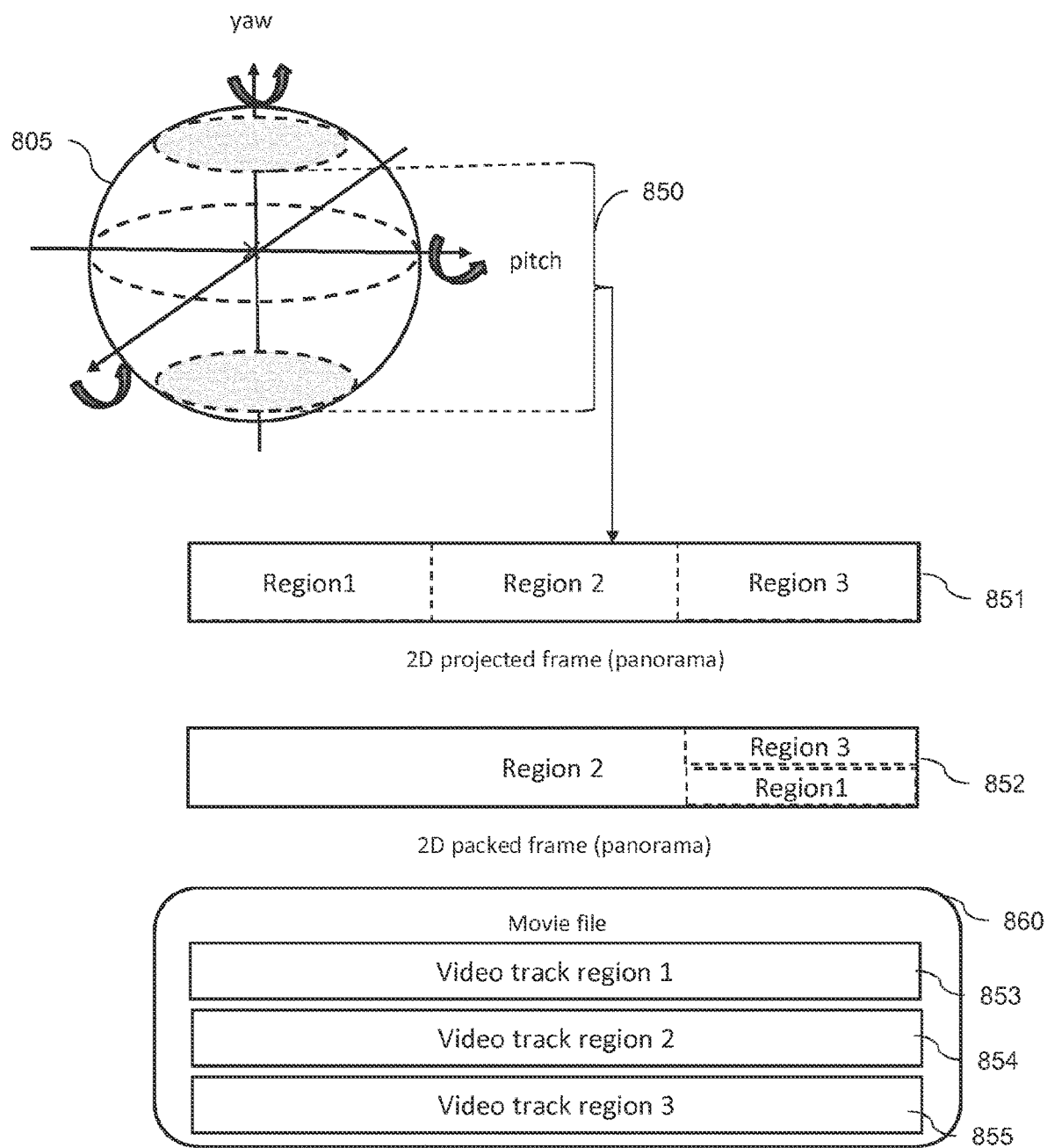

As the FIG. 8 describes an encapsulation of a wide view region, FIG. 8*b* details the generation and encapsulation of video tracks representing a part of a geometrical projection (2D projected image) in the context of 360° panoramic video. (the 360° content 850 from the sphere, without the poles). Typically, such content is recorded by a rig of cameras offering a 360° field of view for the recorded scene. Each recorded view is then stitched in to a single image: the 2D projected image 851, sometimes called a panorama. The projection is typically an equirectangular projection, but can also be a projection onto the faces of a cube or other platonic solid, each face being mapped to a 2D picture. For example, the selected sphere region 850 is split in three regions, parts or spatial parts, each recorded by a camera. This operation may lead to very high resolution videos, typically greater than 8K wide videos. Each panorama image can be rearranged (or "packed") as in 852 into regions on the 2D panorama. For example a region corresponds to or contains a projected spherical viewport from the sphere 850 or a region corresponds to one face of a cube when used as projection type. The regions may or may not match a camera view. Each one of these packed or rearranged images 852 may be each encoded/compressed into one or more video bitstreams (not represented) and encapsulated in an ISOBMFF file 860. The encoding can be performed in HEVC or AVC or any equivalent compression scheme. The encapsulated file contains one or more tracks like 853, 854, 855. For example on FIG. 8*b*, emphasis is put on region '2' compared to regions '1' and '3'. This can be the case for a region with high details or because this is a recommended viewpoint by the content author or for any other criteria. Each track 853-855 may contain descriptive metadata that provide the position and size of the related region in the 2D projected picture and/or the position in the 3D referential associated to the wide view or 360° scene 850. These position and size information can be respectively described in the sample description group with specific descriptors: VisualSampleGroupEntry: RectRegionGroupEntry ('rrif') and SphericalRegionGroupEntry ('srif') explained below. When the packed frame 852 is generated from the panorama 851, a sample description table of the tracks 853-855 contain the mapping between the regions in the 2D projected picture to their corresponding regions in the packed picture. When no packing is done after the stitching leading to the panorama construction 851, the tracks 853-855 contain in a specific descriptor VisualSampleGroupEntry their positions and sizes in the 2D projected picture 851. It is the role of an mp4 writer to set these information while generating the ISOBMFF file 860. The split into regions and the eventual packing are provided by a user controlling the media recording or pre-programmed in an application controlling the rig of cameras or even defined while setting-up the camera rig. This information can be used during encapsulation of the media tracks or even stored as descriptive metadata in the user-data boxes.

Figure 9:
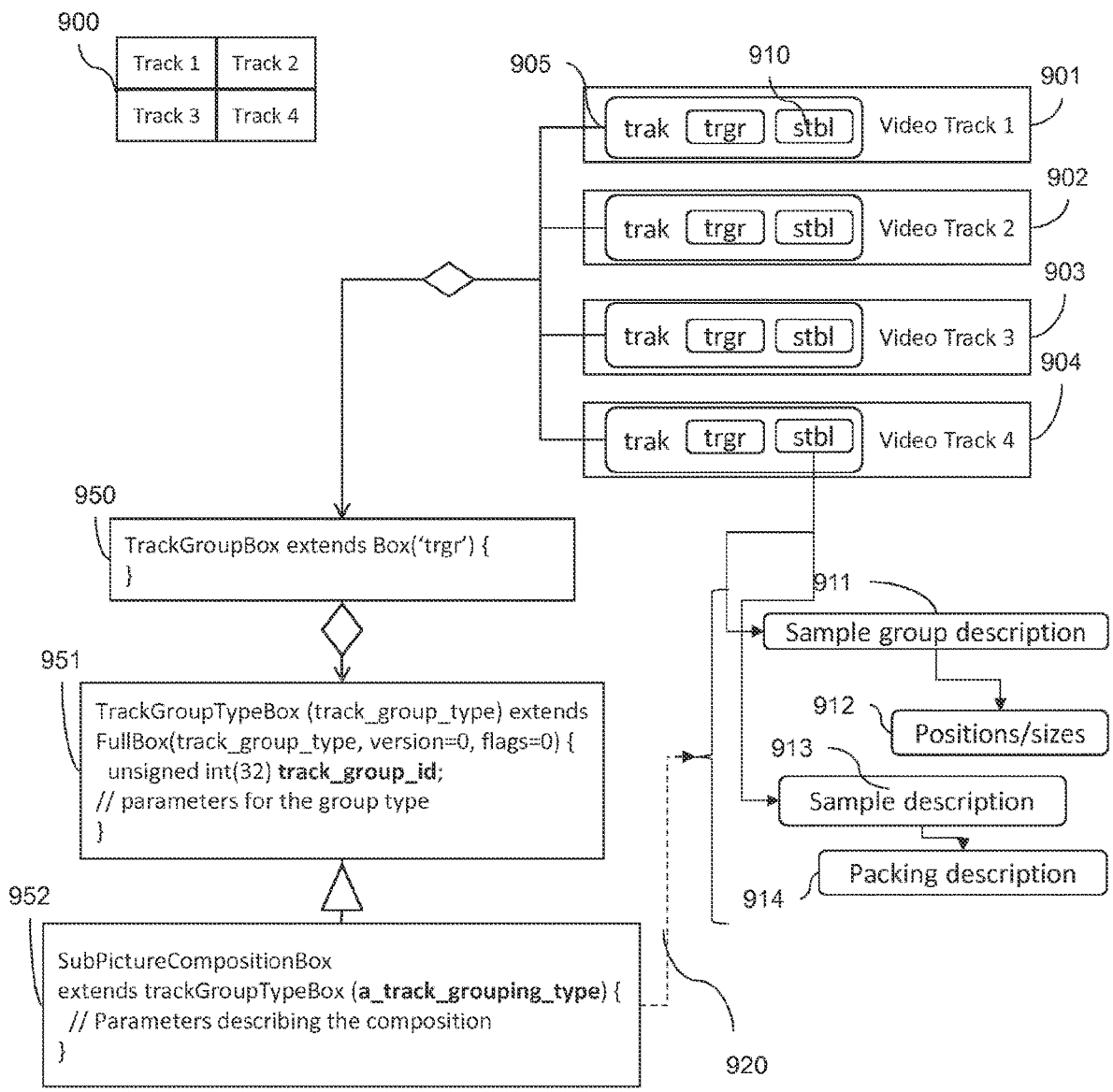
FIG. 9 illustrates the encapsulation of sub-picture tracks forming a track group according to the invention.

FIG. 9 provides an example of a set of tracks (901-904) to be composed, rendered or displayed together. The set of input tracks can contain zero, one or more derived tracks using these input tracks. The set of input tracks can also be tracks of different media types than video and can mix tracks of different media types. For the specific case of a track group describing the spatial composition of input tracks, the input tracks may also be called sub-picture tracks. This is when each sub-picture track covers a spatial part or spatial region of a (bigger) picture. The term picture here shall be interpreted as each picture in a video sequence; i.e. a sub-picture track contains samples each representing a sub-part or spatial region or sub-picture of a full video. In the example of FIG. 9, a track grouping describes four input tracks 901-904 (video tracks in the example) that can be simultaneously composed, rendered or displayed as a higher resolution video 900. This can be used for panoramas (wide/360° view as 850 projected onto a 2D picture as on 851 or 852) for virtual reality or for ultra-high resolution videos.

In an embodiment, each one of the video tracks 901-904 are encoded in an independent bitstream, for example using a video compression scheme like H.264/AVC or H.265/HEVC, or any other video compression method. Each track 901-904 is further encapsulated, for example in an ISOBMFF track, i.e. containing descriptive metadata for the media samples, for example in a 'trak' box like 905.

The description of the samples typically takes place in a sample table box as 910 that itself can contain one or more sample group and sample group description boxes (summarized as 911).

For example, each input track conveys its positions and sizes (in two dimensions) 912 in its sample group description boxes (typically 'sgpd' and 'sbgp'). The positions and sizes can be declared in a VisualSampleGroupEntry 912 like RectRegionGroupEntry ('rrif') or TileRegionGroupEntry ('trif' in case of HEVC format) or any dedicated descriptor in the sample table box. They can also be declared in the visual sample entries, as part of the samples description 913. This is for example the case of "packed frame" resulting from the projection of a 360° video scene onto a 2D panorama, further split, reorganized or packed into regions 914 on another 2D picture before encoding (as in MPEG Omnidirectional Media Application Format's Region WisePackingStruct for example). When all the samples of a track share the same positions and sizes, the positions and sizes are declared in a VisualSampleGroupEntry which is signalled as being the default sample description index in the 'sgpd' box. It allows having a more compact description, thus avoiding the declaration of sample group(s). When the positions and sizes are declared in a VisualSampleGroupEntry of type 'rrif' or in a simplified version as follows (with same semantics as described above);

```
class RectRegionGroupEntry( ) extends VisualSampleGroupEntry ('rrif')
{
   unsigned int(16) region_width;
   unsigned int(16) region_height;
   unsigned int(1) full_picture;
   bit(7) reserved = 0;
   if (!full_picture) {
      unsigned int(16) horizontal_offset;
      unsigned int(16) vertical_offset;
   }
}
```

The corresponding track_group_type box 952 is set as follows:

```
aligned(8) class SubPictureCompositionBox extends
TrackGroupTypeBox('spco') {
   unsigned int(16) composition_width;
   unsigned int(16) composition_height;
}
``` where composition_width specifies, in luma sample units, the width of the composed picture.

composition_height specifies, in luma sample units, the height of the composed picture.

the track_group_id inherited from the TrackGroupTypeBox 951 provides a unique identifier for the group of tracks.

the track_group_type value ('spco' in the example) indicates that it is a group of tracks that are spatially related.

The above embodiment differs from the initial embodiment for 'rrif' because the composition identifier (former region_id in 'rrif') is now described in the track group type box (track_group_id) instead of the sample or sample group description boxes. This allows one track to be part of zero, one or more compositions. It is to be noted that the indication of the "full picture" (also called "full_track" in the 'part' track group example above) can also be placed in the track grouping type boxes. The RectRegionGroupEntry then becomes even simpler:

```
class RectRegionGroupEntry( ) extends VisualSampleGroupEntry ('rrif') {
   unsigned int(16) region_width;
   unsigned int(16) region_height;
   unsigned int(16) horizontal_offset;
   unsigned int(16) vertical_offset;
}
```

The track group 950 and track group type boxes 951-953 indicate that the groups of input tracks 901-904 have a particular relationship. Here, the specific grouping type 'spco' (for "track composition group" 952 indicate that these four input tracks can be implicitly composed together for simultaneous display and rendering as in 900. The corresponding track group type box 952 can still writes as specified above. Optionally, when the content creator encapsulates in the same media file the full video as an alternative track to the sub-picture tracks, the track group type box 952 can contain the flag that indicates whether the current track is the "full video" track or "full picture" track or full track. In this case, only the full video track signals the width and height of the composition of the sub-picture tracks.

```
aligned(8) class SubPictureCompositionBox extends
TrackGroupTypeBox('spco') {
   unsigned int(1) full_picture;
   bit(7) reserved;
   if (full_picture) {
      unsigned int(16) composition_width;
      unsigned int(16) composition_height;
   }
}
```

In an alternative embodiment of the track group type for spatial composition, the "full_picture" flag is systematically present. This comes at no additional cost in terms of signaling (still 1 byte) and allows a parser to deduce that a video track is a sub-picture track ("full_picture" flag set to 0) or a the full picture track ("full_picture" flag set to 1). It may deduce that the track is not intended to be displayed by itself (in opposition to the "full_picture" track):

```
aligned(8) class SubPictureCompositionBox extends
TrackGroupTypeBox('spco') {
   unsigned int(8) full_picture;
   unsigned int(16) composition_width;
   unsigned int(16) composition_height;
}
```

For media players to easily determine whether on track in a track group is intended for display or not, the track group type box can contain a parameter, for example called: "output_track" that when set to 1 indicates that this track can be selected for presentation to a user and when set to 0 that this track is only here for combination with other tracks in the group of tracks and is not intended to be rendered or displayed alone. Another possibility to indicate this track property is to define a specific flags in the track header box, for example "Track_non_displayable": =0x000010 indicates that track is enabled, used in the presentation but is not allowed as preview and is not self sufficient for being rendered alone.

In an alternative embodiment, the track group ('TrackGroupBox') contains the set of input tracks with one corresponding to a region of interest, for example a particular viewpoint in a 360° content or a particular object in a 2D video. For such case, the track group type box ('TrackGroupTypeBox') may contain an additional flag instead or in combination with the full_picture flag from the previous embodiment for 'spco':

```
aligned(8) class SubPictureCompositionBox extends
TrackGroupTypeBox('spco') {
   unsigned int(1) full_picture;
   unsigned int(1) roi_picture;
   bit(6) reserved;
   if (!roi_picture && full_picture) {
      unsigned int(16) composition_width;
      unsigned int(16) composition_height;
   }
}
```

Again, this ROI indication feature comes at no additional cost in terms of signaling (using one of the reserved bits) and allows a parser to deduce that a video track is a sub-picture track corresponding to the ROI ("roi_picture" flag set to 1). It may deduce that this sub-picture track can be rendered by itself by exposing this track to the user through a graphical user interface. When used in streaming or transported on a network, this track can be marked or signalled as having some priority against the other sub-picture tracks.

In another alternative embodiment, another flag is used in the SubPictureCompositionBox to mix in a track group tracks or sub-picture tracks with static positions and sizes and tracks or sub-picture tracks with dynamic positions and sizes, as follows:

```
aligned(8) class SubPictureCompositionBox extends
TrackGroupTypeBox('spco') {
    unsigned int(1) full_track ;
    unsigned int(1) dynamic_coordinates;
    bit(6) reserved;
    if (full_track) {
        unsigned int(16) composition_width;
        unsigned int(16) composition_height;
    }
    if (dynamic coordinates) {
        unsigned int (32) track_ID;
    }
}
```

Note that this additional flag called dynamic_coordinates can combine with the other flags in the various embodiments for spatial composition track group. When a track or sub-picture track in the group of tracks has static positions and sizes, this flag is set to 0 or false value. At the opposite, when one track or sub-picture track has dynamic positions and sizes in another track, typically a timed-metadata track, this flag is set to 1 or true and the track identifier of this another track is indicated in the track_ID parameter.

Figure 10:
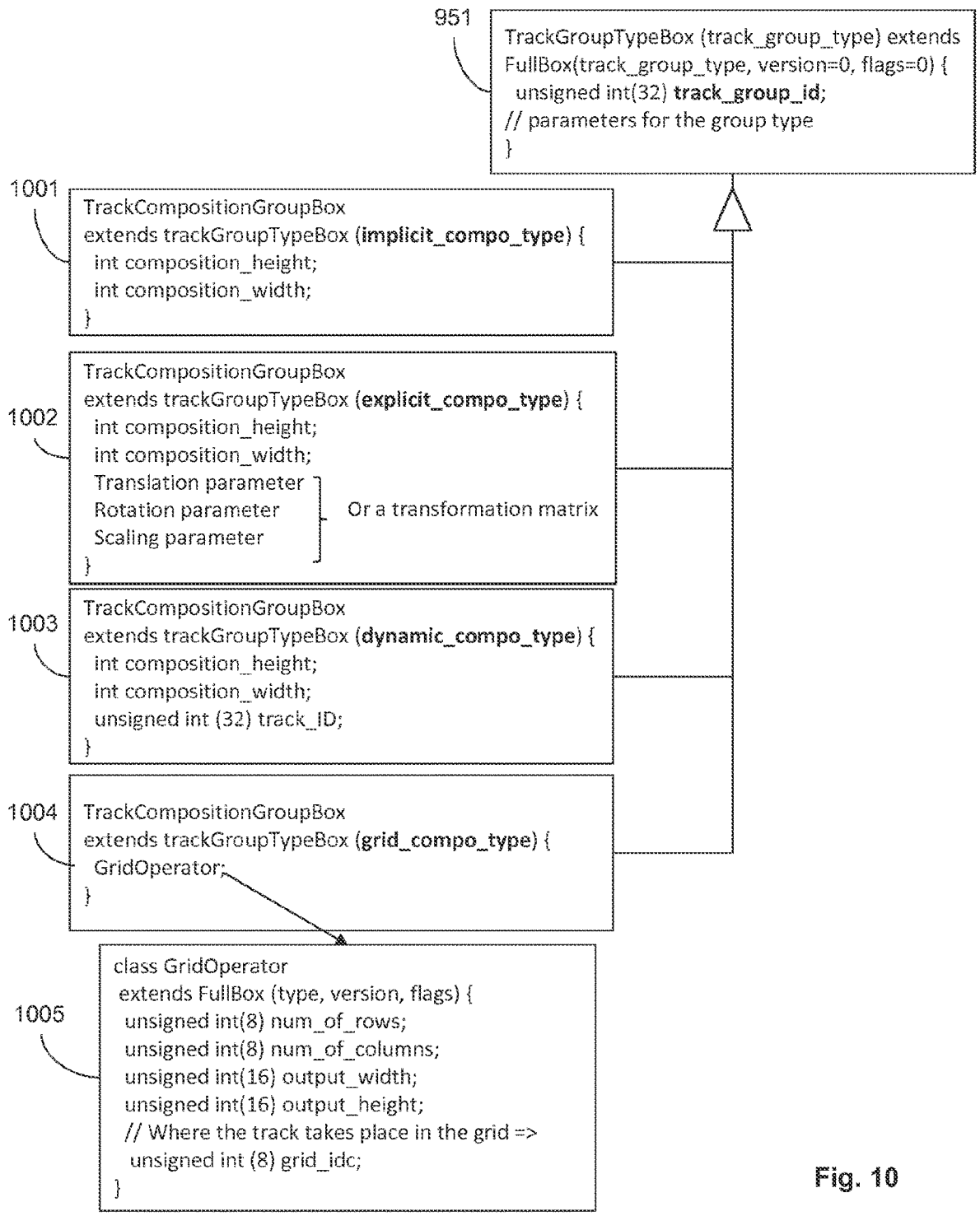
FIG. 10 illustrates different types of track groups for spatial composition.
Figure 11:
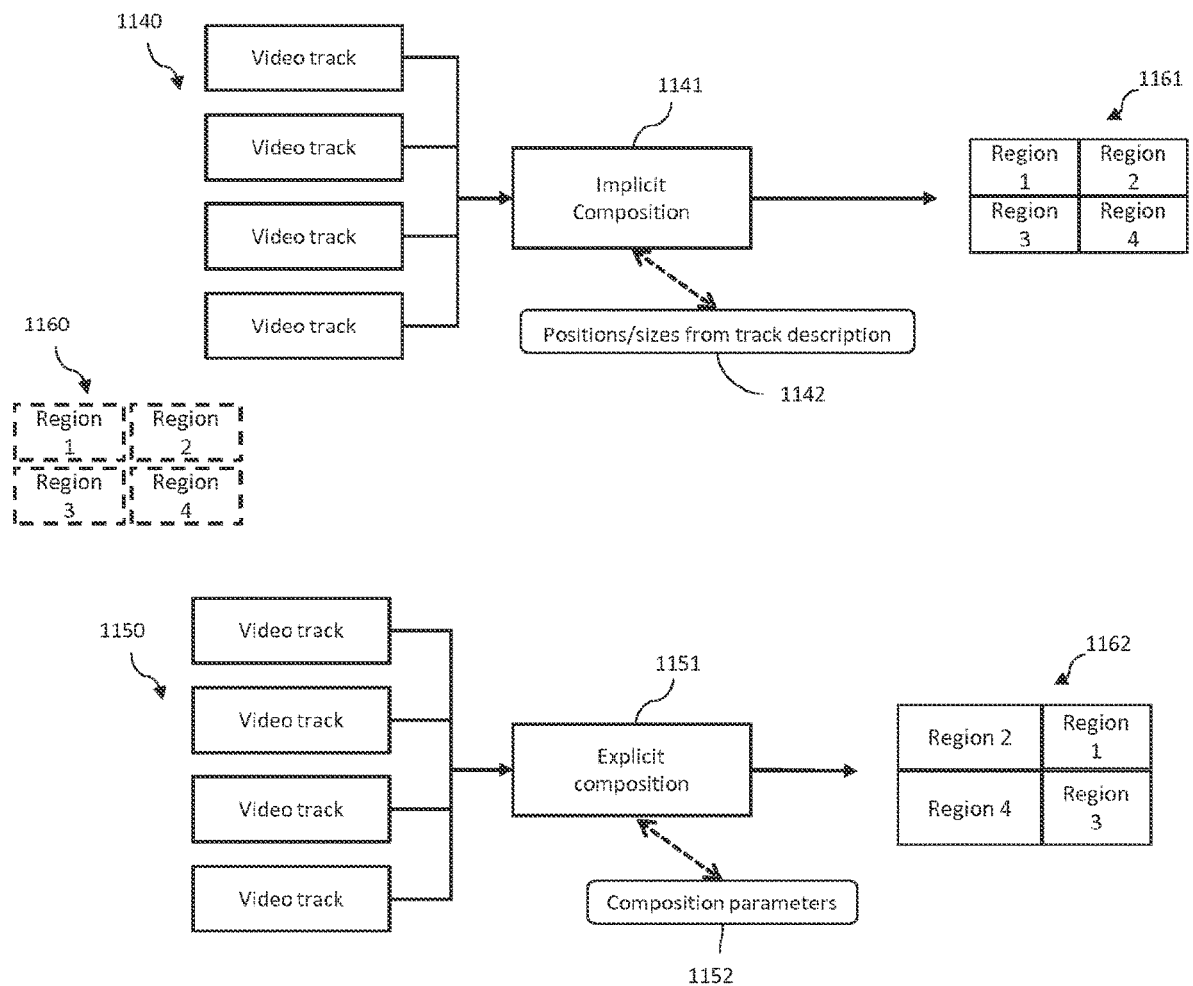
FIG. 11 illustrates implicit and explicit composition.

The FIG. 10 illustrates different kinds of track group type box ('TrackGroupTypeBox') that are more or less descriptive and prescriptive regarding the tracks contained in the track group. The track group type box 950 in FIG. 10 is the track group type box as standardized in ISO/IEC 14496-12 (ISOBMFF). This invention defines different kinds of track group type boxes ('TrackGroupTypeBox') to handle sub-picture tracks.

The first kind of track group type box ('TrackCompositionGroupBox') is the one depicted on 1001. It inherits a track_group_id from the box 951 and declares a specific track_grouping_type: the "implicit compo_type". Note that to comply with ISOBMFF rules, a four character-code should be reserved to represent this "implicit compo_type", for example: 'spci' for "spatial composition implicit". It means that this track group 1001 relies on information already available in each sub-picture track (in track header part of 905, in sample entries 913 or in sample group descriptions 911 . . . ) to render or display these sub-picture tracks as they were spatially arranged in the source encoded and encapsulated into this set of tracks. This box 1001 also contains the sizes of the resulting composition of the sub-picture tracks. Optionally, it can also contain one or all the flags described in the alternatives for 'spco' track group type box. As depicted on FIG. 9, this kind of track grouping type box does not contain positions and sizes of each sub-picture track. Instead it implicitly refers (link 920) to the descriptive metadata describing the track or the samples already present in each track. It allows avoiding duplication of descriptive metadata. Moreover, it allows the positions and sizes and spatial arrangement of the sub-picture tracks to vary along time. It can vary at the track fragment granularity thanks to the use of sample grouping mechanism. This is not the case when declaring the positions and sizes of each sub-picture track in the track group type box 952 itself. The processing of 952 and 920 is described according to FIG. 12.

Another kind of track group type box 1002 defines another track_grouping_type for "explicit compo type". As above, a four character code should be reserved for this track grouping type, for example 'spce' for "spatial composition explicit". This box 1002 declares in addition to the composition width and height (eventually combined with one or all the flags mentioned for 'spco') new spatial arrangement of the sub-picture tracks. This can be seen as a variant of the derived tracks. Especially the new box 1002 declares 2D translation parameters for a sub-picture track to change its position in the resulting presentation. The declaration is optional, and can be set to (0, 0) instead. As well, optional rotation and scaling factors can be declared to change the disposition and/or the sizes of a sub-picture track in the resulting composition or presentation. It is to be noted that a composition matrix as defined in the track or movie header can be declared for that purpose. A player encountering such track grouping type box has the positioning, transformation information to render each sub-picture tracks according to the media author specification.

An alternative embodiment to the explicit composition 1002 is depicted as 1004 and 1005. Another kind of track_grouping_type box 1004 indicates a grid-based composition ('grid_compo_type'). As for others, a specific four-character should be reserved and declared for that purpose, for example: "spcg" for "spatial composition grid". The parameter contained in this new kind of box 1004 is a grid operator as on 1005. It declares a grid where each sub-picture track of the track group can be placed to render a kind of mosaic video. The location of a sub-picture track in this mosaic video is given by the last grid_idc parameter. As for other variants, one or all the flags available for 'spco' could be also contained in the box 1005. Processing such track group box at player side is as follows: the input images for each sub-picture track are inserted in the 1-based index of the grid in a row-major order, top-row first, left to right. In case the sizes of the sub-picture track does not match the size of the grid's cell, a scaling is implicitly performed to fit in cell's size. An optional flag can be set to indicate whether the pixel aspect ratio should be preserved or not. Another optional flag can indicate whether stitching is expected or not.

The reconstructed image is formed by composing the decoded input pictures from the sub-picture tracks into a grid. The grid has a column width in luma pixels unit equal to output_width divided by num_of_columns and has a row height in luma pixels equal to output_height divided by num_of_rows. without gap or overlap. When no stitching is expected, then trimming is performed on the right and the bottom to the indicated output_width and output_height. This grid operator 1005 can also be used as a Transform Property or a transformation operator for derived tracks. When used, it is stored in the TransformPropertyContainer 314 and the track_idc may not be required. Indeed, the grid can consider as input the input tracks indicated by the track reference type 'dtrp' 341. In such case, the order of these reference indicates the position in the grid.

Another embodiment of the track group for spatial composition is the new box 1003. This box has the specific track_grouping_type value indicating that the composition is dynamic. (A 4-character code should also be defined and reserved for that purpose). It is a specific kind of explicit composition in the sense that the composition parameters, mainly positions and sizes are provide in an external metadata track, for example a timed metadata track as in Amendment 1 of ISO/IEC 23001-10". A specific parameter is provided in this track group: a track identifier to the metadata track providing the composition parameters. This is useful to relate the video track to the metadata track, because the track reference linking the metadata track to the video track is unidirectional (a 'cdsc' track reference type to a video track or a 'cdtg' track reference type to a track in a group). Having directly the track_ID in the track group makes easier for a media player the retrieval of the composition parameters. As for other kinds of spatial composition track groups, the box 1003 contains the resulting composition width and height. Optionally, it can also contain one or all the flags declared in variants of the 'spco' track group type box. While the FIG. 10 illustrates different kinds of track group type boxes for spatial composition (as different boxes are identified by a specific track_grouping_type and reserved four-character code), it is to be noted that these different kinds can also be signalled in other ways. One possible way is to use a single 4-character code, for example the 'spco' code and the "version" parameter of the box. Instead of inheriting from a track group type box with version=0 as in 951, the version parameter can vary. For example, version=0 corresponds to implicit composition 1001 while version=1 indicates explicit composition 1002 and version=2 to dynamic composition 1003. Version=3 could indicate the grid-based composition 1004. The specific parameters of each box are included only for a specific value of the version parameter. For example:

```
aligned(8) class SubPictureCompositionBox extends
TrackGroupTypeBox('spco', version) {
  // Optional flags parameters applying to any kind of composition
here
  unsigned int(16) composition_width;
  unsigned int(16) composition_height;
  if (version == 0) {
    // parameters for implicit composition (if any)
  } else if (version == 1) {
    // parameters for explicit composition, for example as in 1002
  } else if (version ==2) {
    // parameters for dynamic composition, example: as in 1003
  } else if (version ==3) {
    // parameters for grid-based composition, example: as in 1004
  }
}
```

In an alternative embodiment, the different kinds of track group type boxes are signalled with the flags parameter (instead of version parameter above). This way, a single track_grouping_type is used, for example 'spco'. The specific spatial composition track group type box with type 'spco' inherits from a TrackGroupTypeBox with flags not set to 0 as in 951 but possibly taking different pre-defined values like tg_explicit_composition=0x000001 to indicate that the composition is an explicit composition (similar to version=1 in previous embodiment). By default, the composition is considered implicit (version=0 and flags=0). Other flags can be defined like tg_dynamic_composition=0x000002 and tg_grid_composition=0x000004. These can be used as the different values for the version parameter as explained in the above embodiment.

Another aspect concerning the overloading of the track group type box is the possibility to define the track group identifier not limited to integer as currently the case in ISOBMFF. This can be useful to declare a group of tracks containing tracks that are not necessarily contained in the same media file. This allows to associate tracks in a media file with remote tracks in other files or located on a different server. This can be done through a specific value of the "flags" or of the "version" parameter. The track group type box can then be redefined as follows (here using the version parameter):

```
aligned(8) class TrackGroupTypeBox(unsigned int(32) track_group_type)
extends FullBox(track_group_type, version, flags = 0)
{
if (version == 0) {
  // identifier local to the media file
  unsigned int(32) track_group_id;
} else if (version == 1) {
  // global identifier for the track group
  DataEntryUrnBox('urn ',_ entry_flags) global_track_group_id;
}
// the remaining data may be specified for a particular
track_group_type
}
```

Where global_track_group_id is a URN entry, for example a DataEntryUrnBox as defined in ISOBMFF. The parameter "name" in the DataEntryUrnBox is required. The parameter "location" is optional. Each "name" and "location" parameter is a null-terminated string using UTF-8 characters.

Figure 13:
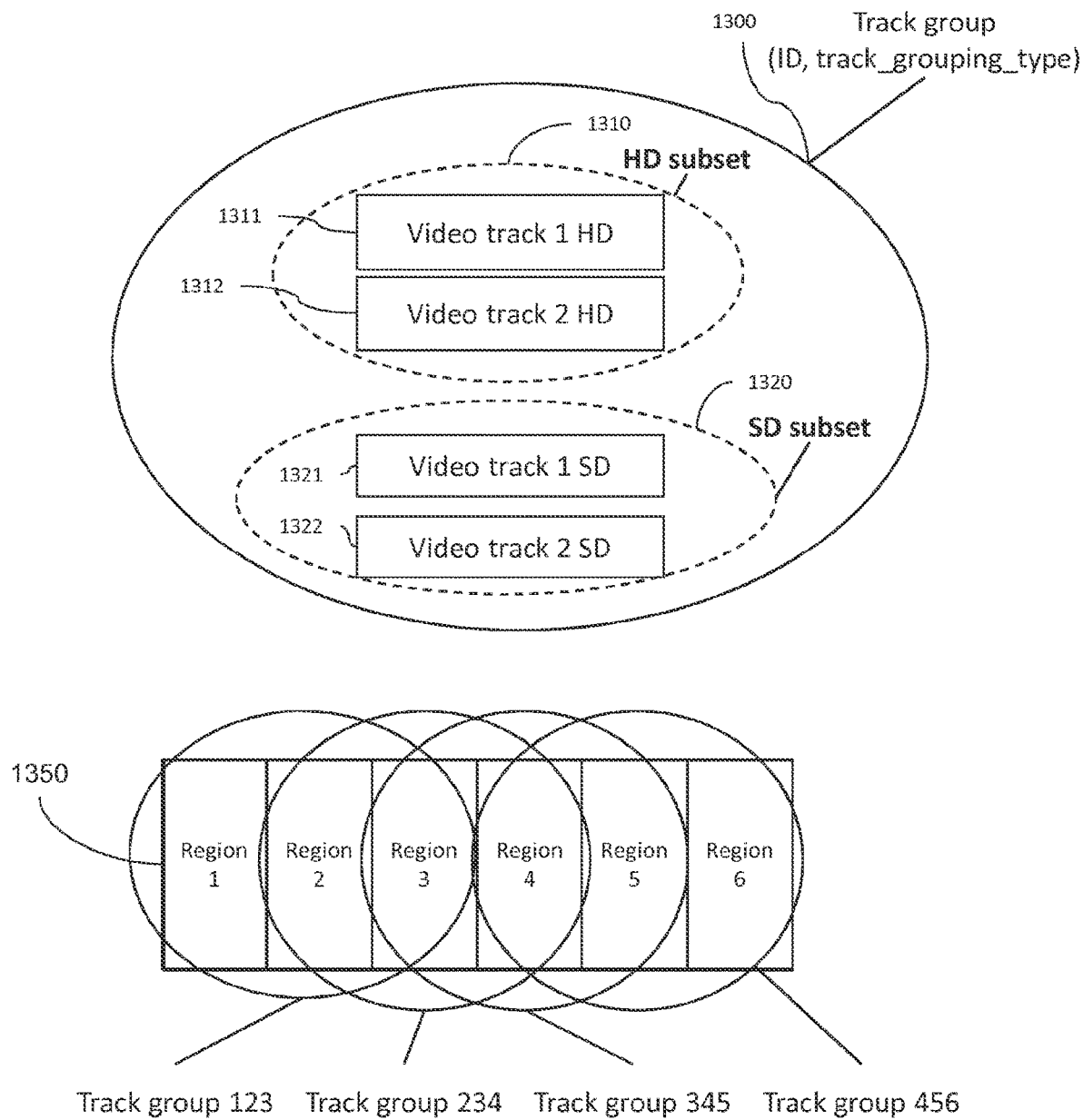
FIG. 13 illustrates subsets in track groups and overlapping track groups according to the invention.

FIG. 13 illustrates another feature for track groups: the notion of subsets. In 1300, a track group containing four input tracks is provided. Actually two sub-picture tracks are present (video 1 and video 2), but each in a different resolution. These tracks can then be gathered as two subsets where each subset has a different resolution: for example subset 1310 contains the High Definition (HD) videos while subset 1320 contains Simple Definition (SD) video. This means that implicitly the track 1311 and 1312 can be spatially combined into a bigger video (2 times HD resolution) and as well tracks 1321 and 1322 can also be combined into a bigger video (2 tiles SD resolution). To allow subset description in track group, the TrackGroupTypeBox is modified as follows. First, it is a new version of this box (a version number not in conflict with the kind of composition described above) or a new flags value (ex: contains_subset=0x000008). The example below is shown with a version number set to 1. This can be used whatever the kind of grouping, not limited to spatial composition.

```
aligned(8) class TrackGroupTypeBox(unsigned int(32) track_group_type)
extends FullBox(track_group_type, version, flags)
{
  unsigned int (32) group_track_id;
  if (version == 1) { // Note: could also be based on flags value
    TrackGroupSubsetBox subset;
  }
  // parameters describing this track group type
}
```

Where the TrackGroupSubsetBox is defined as follows:

```
aligned(8) class TrackGroupSubsetBox extends FullBox('trgs', version,
flags) {
unsigned int (8) subset_idc;
// parameters describing the subset
// For example in 1310, 1320, the composition sizes
}
```

Where subset_idc indicates the indice of the subset in the track group. It is a 1-based number with scope limited to the contained track group. No more than 256 subsets can be defined in a track group. Each track pertaining to a track group and to a particular subset conveys the indice of the subset it corresponds to. For example in 1300, tracks 1311 and 1312 would have a TrackGroupSubsetBox with subset_idc=1 number of track group subsets contained in the track while tracks 1321 and 1322 would have TrackGroup- SubsetBox with subset_idc=2. Each subset would declare its own composition size (no more a property of the track group then). This allows finer description of the track groups by placing parameters of the whole group in the TrackGroup-TypeBox and subset-specific information in the TrackGroupSubsetBox. The subset parameters could even overload the parameters declared in the TrackGroupTypeBox. This allows default parameters values to be defined for all the tracks inside a track group and to specify only for a subset of tracks pertaining to a specific subset. To allow a track to be part of more than one subset, the TrackGroupTypeBox can use a version number to provide an array of subsets instead of only one instance. A parameter specifying the number of subsets is also present in the TrackGroupTypeBox as follows:

```
aligned(8) class TrackGroupTypeBox(unsigned int(32) track_group_type)
extends FullBox(track_group_type, version, flags)
{
   unsigned int (32) group_track_id;
   if (version == 1) { // Note: could also be based on flags value
      TrackGroupSubsetBox subset;
   } else if (version==2) {
      unsigned int (8) num_of_subsets;
      for (int i=0; i< num_of_subsets ; i++) {
         TrackGroupSubsetBox subsets[ ];
      }
   }
}
```

The subset can also be used to define some composition restriction: for example HD tracks only combine with other HD tracks and not with SD ones. A subset may also be used to describe another composition of tracks in the track group that leads to a video also available for rendering or display. In an alternative embodiment, the subset feature can be specified in the TrackGroupBox itself, instead of the TrackGroupTypeBox, following the same principle: version or flags value. Another interest of this subset feature is for description of the media file in streaming manifests. For example the MPEG DASH standard support spatial relationship description (SRD) in its MPD manifest. SRD has a parameter called spatial_set_id that provides an identifier for a group of Spatial Object. Then, sub-picture tracks with the same subset_idc as in 1300 can be described in the DASH MPD with an SRD descriptor having as spatial_set_id value the value of the subset_idc parameter.

For versions of track group type box ('TrackGroupTypeBox') without TrackGroupSubsetBox, the subset_idc or spatial_set_id parameter can be directly included as a parameter of the track_group_type box ('TrackGroupTypeBox'). It can be included in both implicit and explicit track group boxes for spatial composition, i.e. it can be combined with composition information like positions and sizes, and optionally transformation parameters. Still on FIG. 13, the video 1350 is split into 6 spatial regions, each represented by a video track, a sub-picture track. While the video 1350 is very high definition video, probably out of profiles and levels (maximum allowed sizes) of available video codecs, each sub-picture track or subset of sub-picture tracks conform to a given profile or level. Then, it may be advantageous to offer some granularity on the spatial access in the video sequence 1350 to media players. The track group can be used to signal this by defining the profile and level required to process one or more regions. For example in 1350, several track groups are defined grouping three sub-picture tracks. Each track group then conveys, in addition to composition parameters, the profile_tier_level information resulting from the spatial composition of the 3 sub-picture tracks. Moreover, this organization can be useful for navigation into immersive content like 360 content or virtual reality content, by transmitting the tracks of a track group and not the full video 1350. Moreover handling the overlap between the track group is a good way to avoid defining video tracks each encapsulating 3 sub-picture tracks since it avoids data duplication.

One advantage of implicit composition track group 1141 is that it refers and uses parameters stored in sample description (as illustrated and described according to FIG. 9). This brings some flexibility in the sub-picture organisation since, sample entries and sample group descriptions can be updated along time, for example on a track fragment basis. This allows to define a track group independently of the track properties (for example position, size). This is particularly interesting for tile-based encoding where the tiling configuration changes along time (this can be done in HEVC by updating the Picture Parameter Set along the video sequence). For example, in a video surveillance application, the tiling configuration can be adapted to match one object of interest in the video sequence that is being tracked. Having one tile enclosing this object allows ROI-based streaming and saves transmission bytes. This is handled by trif or rrif VisualSampleGroupEntry and sample grouping mechanism. This is not possible with track groups. To allow this, this invention also proposes to extend the track group so as to allow track fragment groups. This is useful for explicit composition where the track group or track fragment group contains the composition parameters. With track fragment group box, these parameters can be updated along time. The number of tracks in the group can also vary along time. This new box can be declared as follows:
Box Type: 'tfgr'
Container: TrackFragmentBox ('traf')
Mandatory: No
Quantity: Zero or one This box enables indication of groups of tracks valid for a track fragment, where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track fragment group. The tracks that contain the same type of a contained box within the TrackFragmentGroupBox and have the same identifier value within these contained boxes belong to the same track fragment group.
Track fragments groups shall not be used to indicate dependency relationships between tracks fragments.

```
aligned(8) class TrackFramentGroupBox extends Box('tfgr') {
}
aligned(8) class TrackFragmentGroupTypeBox(unsigned int(32)
track_group_type) extends FullBox(track_group_type, version = 0, flags
= 0)
{
   unsigned int (32) track_fragment_group_id;
   // the remaining data may be specified for a particular
track_fragment_group_type
}
``` track_fragment_group_type indicates the grouping type and shall be set to one a value registered, or a value from a derived specification or registration. It can be for example the 'part' value defined by this invention to describe the spatial organization of sub-picture tracks.

The track_fragment_group_id is a unique identifier in the whole media file. When its value is the same from one fragment to another for the same track, it corresponds to the same group of tracks. When the tracks in the track fragment group change from one fragment to another, the track_fragment_group_id should also change to inform media players. It is recommended, when using track fragment groups, that the fragments are aligned (temporally) between the tracks pertaining to the track fragment group. Optionally, a 'trgr' box at trak level can be parameterized so as to indicate that it is overloaded in some fragments or that it will remain constant along the whole media duration. This can be done with a specific flags value for the 'trgr' box.

Figure 12:
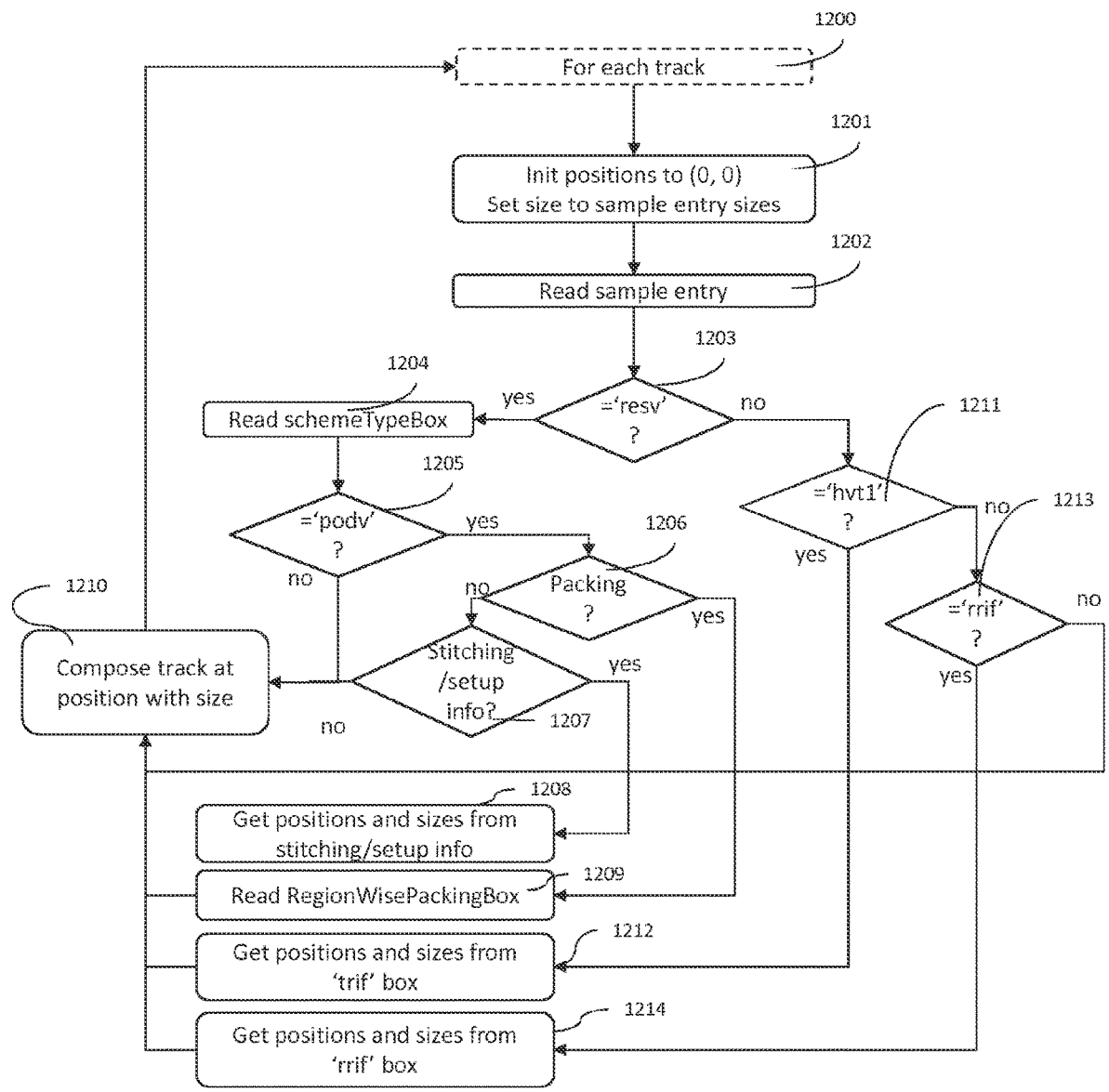
FIG. 12 illustrates the parsing process for media file with implicit composition.

FIG. 12 describes the processing by a media player or ISOBMFF parser of media files according to one aspect of the invention: the case of a track group describing a spatial composition of tracks or sub-picture tracks. A first step not represented in the FIG. 12 is the parsing of each trak box of the tracks present in the media file. During the parsing a list of tracks containing a track group box 'trgr' is established, and for each group the list of tracks contained in this group.

The FIG. 12 describes the processing of the tracks for one track group corresponding to an implicit spatial composition track group, starting at 1200. First, the current track has its position set to (x=0, y=0) by default and its sizes set to the width and height declared in the track header box at step 1201. Then in 1202, the sample table box is parsed looking for the sample entries declared in the track. If the sample entry has the value 'resv', test 1203, the parser looks for a SchemeTypeBox at step 1204. If the scheme type is set to a value indicating that the track contains a projected omnidirectional video, test 1305 true, then the parser looks for region-wise packing information in 1206, typically looking for a RegionWisePackingBox.

If none can be found, the parser looks for stitching or setup information in user-data boxes at step 1207. If none can be found, test 1207 false, the size of the track is set to the width and height provided in the original sample entry of the track or in the projected picture width and height and composed with these positions and sizes in 1210. If user data boxes provide stitching information of camera setup information providing position and size for the track, this is used in step 1208 to set appropriate position and size and then compose the track in 1210. When packing information is present at step 1206, the information is used to get packed position and size for the track in step 1209 and the track is composed with these values in 1210. When the scheme type is unknown or does not correspond to omnidirectional content, or media content candidate for composition, the default position and sizes are used in 1210. When the test 1203 returns false, the sample entry value is tested against 'hvt1', 'lht1' or any sample entry value indicating that the current track is a tile track, step 1211. If this is the case, the positions and sizes are parsed from the 'trif' box in 1212.

Otherwise the parser looks for a generic region descriptor like for example 'rrif' in 1213. If one is found, the parameters in this 'rrif' or an equivalent descriptor is used to set the positions and sizes of the track in 1214. The process iterates until all the tracks of the track group are processed. The step 1210 consists in associating in the list of tracks pertaining to the track group their respective positions and sizes to apply for composition and rendering during the decoding of the corresponding bitstream. The processing of FIG. 12 is part of the player initialization step. It can also occur during the decoding if track fragment groups are in use. Then, periodically, the composition parameters can be updated by processing as from 1200 each time a new track fragment occurs.

The track group for spatial composition also applies to input tracks encoded as independent HEVC tiles further encapsulated into tile tracks according to ISO/IEC 14496-15 4$^{th}$ edition. In this case the tracks or sub-picture tracks pertaining to the track group are tile tracks. Their tile base track should also be part of the same track group. As explained in reference to FIG. 12, the implicit composition uses the positions and sizes given in 'trif' box. The 'trif' descriptor conveys the positions and sizes of the tile in its original sequence. The tile base track and each tile track are all associated to the same track group (their 'trak' box contains a 'trgr' box). One advantage of using tile tracks in implicit spatial composition or using the grid operator either for derived tracks or in spatial composition track group, is that the composition can be done in the compressed domain (by bitstream concatenation for example or through light transcoding of slice positions). When used in derived tracks and grid operator, the Transform_post_decoding flag or any equivalent means in the derived track is set to 0 to indicate that the operation does not require decoding of each track. This is the case for HEVC bitstreams encoded with motion-constrained and/or independent tiles. Usually, when the grid or spatial composition uses independent video bitstreams, the operation is done after decoding.

Another embodiment consists in declaring the track association at the top level of the media file directly in 'moov' box and no more in each 'trak' box. A new structure is then defined that provides a unique identifier for the association of tracks, a type providing information on this association or the purpose of this association and the list of tracks (track_IDs) contained into this association. This kind of declaration has the benefits of avoiding repetition of information in each track being part of the track association. Such track association could for example reflect at file format level the Preselection or bundle concept of MPEG DASH: a set of tracks that when played together improve the user experience. Alternatively, this new box can be declared as part of the user data in the 'udat' box, for example in the same way as the track selection box but for complementary or associated tracks. The common parameters of the tracks in the track association are provided as a list of attributes.

Box Type: 'tass'
Container: UserDataBox ('udta') or MovieBox ('moov')
Mandatory: No
Quantity: Zero, One or More The track association box is contained in the user data box or directly in the Movie Box of the media file it describes.

```
aligned(8) class TrackAssociationBox
    extends FullBox('tass', version = 0, 0) {
    unsigned int(32) track_association_id;
    KindBox track_association_type;
    unsigned int(32) track_ID_list[ ];
    unsigned int(32) attribute_list[ ]; // to end of the box
}
```

With the following semantics
  track_association_id is an integer providing a unique identifier for the tracks association that specifies a group or collection of tracks.

track_association_type is a generalization of the KindBox initially defined in ISOBMFF for tracks but extended to the description of any part of the movie or media file.

track_ID_list provides the list of tracks pertaining to this track association.

attribute_list is a list, to the end of the box, of attributes. The attributes in this list are common properties applying to all tracks of the track association.

Any step of the algorithm shown in FIGS. 4, 5 and 6 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for generating media files from a video sequence, the method comprising:
dividing the video sequence into multiple pieces;
generating multiple video tracks to store the divided video sequence, each video track being associated with descriptive metadata, the descriptive metadata comprising:
spatial information indicating that the video sequence is divided into multiple pieces, and
a flag indicating that a track of the multiple video tracks is not intended to be presented alone; and
generating the media files including the generated multiple video tracks along with the descriptive metadata.

2. The method of claim 1, wherein said descriptive metadata box is a 'TrackGroupType' box.

3. The method of claim 1, wherein said pieces are spatial regions.

4. A non-transitory computer-readable storage medium storing instructions of a computer program for implementing a method according to claim 1.

5. A method for parsing media files comprising video data corresponding to a video sequence, the video data being composed of a plurality of samples, the method comprising:
obtaining video tracks, each of the video tracks comprising samples of a piece of the video sequence, and said each of the video tracks being associated with descriptive metadata, the descriptive metadata comprising:
spatial information indicating that the video sequence is divided into multiple pieces, and
a flag indicating that a track of the multiple video tracks is not intended to be presented alone.

6. The method of claim 5, wherein said descriptive metadata box is a 'TrackGroupType' box.

7. The method of claim 5, wherein said pieces are spatial regions.

8. A non-transitory computer-readable storage medium storing instructions of a computer program for implementing a method according to claim 5.

9. A device for generating media files from a video sequence, the device comprising a processor configured for:
dividing the video sequence into multiple pieces
generating multiple video tracks to store the divided video sequence, each video track being associated with descriptive metadata, the descriptive metadata comprising:
spatial information indicating that the video sequence is divided into multiple pieces, and
a flag indicating that a track of the multiple video tracks is not intended to be presented alone; and
generating the media files including the generated multiple video tracks along with the descriptive metadata.

10. A device for parsing media files comprising video data corresponding to a video sequence, the video data being composed of a plurality of samples, the device comprising a processor configured for:
obtaining video tracks, each of the video tracks comprising samples of a video sequence, and said each of the video tracks being associated with descriptive metadata, the descriptive metadata comprising:
spatial information indicating that the video sequence is divided into multiple pieces, and
a flag indicating that a track of the multiple video tracks is not intended to be presented alone.

* * * * *